US010357027B2

(12) United States Patent
Othon

(10) Patent No.: US 10,357,027 B2
(45) Date of Patent: Jul. 23, 2019

(54) BAIT STATION FOR PEST CONTROL

(71) Applicant: Rentokil Initial PLC, Surrey (GB)

(72) Inventor: Savvas Othon, Surrey (GB)

(73) Assignee: Rentokil Initial PLC, Camberley (GB)

( * ) Notice: Subject to any disclaimer, the term of this patent is extended or adjusted under 35 U.S.C. 154(b) by 345 days.

(21) Appl. No.: 15/106,049

(22) PCT Filed: Sep. 9, 2014

(86) PCT No.: PCT/GB2014/052723
§ 371 (c)(1),
(2) Date: Jun. 17, 2016

(87) PCT Pub. No.: WO2015/092353
PCT Pub. Date: Jun. 25, 2015

(65) Prior Publication Data
US 2017/0035041 A1 Feb. 9, 2017

(30) Foreign Application Priority Data
Dec. 18, 2013 (GB) .................................. 1322424.1

(51) Int. Cl.
*A01M 25/00* (2006.01)
*A01M 23/20* (2006.01)
(52) U.S. Cl.
CPC ............ *A01M 23/20* (2013.01); *A01M 25/00* (2013.01); *A01M 25/004* (2013.01)
(58) Field of Classification Search
CPC .... A01M 25/00; A01M 25/004; A01M 23/02; A01M 23/08; A01M 23/14; A01M 23/16; A01M 23/20
(Continued)

(56) References Cited

U.S. PATENT DOCUMENTS 3,225,485 A * 12/1965 Powell .................. A01M 23/00
43/131
4,062,142 A * 12/1977 Marotti ................. A01M 23/16
43/131
(Continued)

FOREIGN PATENT DOCUMENTS

CA 2939325 A1 * 8/2015 .......... A01M 25/004
CA 2973503 A1 * 7/2016 .......... A01M 25/002
(Continued)

OTHER PUBLICATIONS

Translation of KR 10-0863112 (Year: 2008).*
International Search Report dated Nov. 25, 2014 for PCT application No. PCT/GB2014/052723.

*Primary Examiner* — Darren W Ark
(74) *Attorney, Agent, or Firm* — Ohlandt, Greeley, Ruggiero & Perle, L.L.P.

(57) ABSTRACT

A bait station for pest control is provided that comprises an enclosure. The enclosure defines an access chamber that includes an entry port for entry of a pest therein, and a bait chamber that holds a bait product harmful to a pest. A partition section separates the access chamber and the bait chamber. A closure element is associated with the access port and is moveable between a first position covering the access port, and a second position exposing the access port. A detector arrangement outputs a signal indicative of presence or otherwise of a pest in the access chamber. A controller receives the signal and records a pest activity event. The controller moves the closure element to the second position to open an access port between the access chamber and the bait chamber when a number of recorded pest activity events are at least equal to a predetermined number.

8 Claims, 9 Drawing Sheets

(58) Field of Classification Search
USPC .............................................. 43/131, 64–67
See application file for complete search history.

(56) References Cited

U.S. PATENT DOCUMENTS

| | | | | |
|---|---|---|---|---|
| 4,182,070 A * | 1/1980 | Connelly | A01M 25/004 | 220/263 |
| 4,261,132 A * | 4/1981 | Carothers | A01M 25/004 | 43/131 |
| 4,349,982 A * | 9/1982 | Sherman | A01M 25/004 | 43/131 |
| 4,453,337 A * | 6/1984 | Williams | A01M 25/004 | 119/51.01 |
| 4,541,198 A * | 9/1985 | Sherman | A01M 25/004 | 43/131 |
| 4,541,199 A * | 9/1985 | Reidinger, Jr. | A01M 25/00 | 222/58 |
| 4,570,377 A * | 2/1986 | Primavera | A01M 25/004 | 43/131 |
| 4,825,581 A * | 5/1989 | Dailey | A01M 25/004 | 43/131 |
| 4,862,145 A * | 8/1989 | Meehan | A01M 31/00 | 340/573.2 |
| 4,890,415 A * | 1/1990 | Fressola | A01M 23/18 | 43/58 |
| 5,446,992 A * | 9/1995 | Stewart | A01M 25/004 | 43/131 |
| 5,815,982 A * | 10/1998 | Garretson | A01M 1/103 | 43/121 |
| 6,088,948 A * | 7/2000 | Rønnau | A01M 23/02 | 43/64 |
| 6,098,334 A * | 8/2000 | Stouffer | A01M 23/18 | 43/58 |
| 6,164,010 A * | 12/2000 | Snell | A01M 1/026 | 43/114 |
| 6,202,340 B1 * | 3/2001 | Nieves | A01M 23/02 | 43/61 |
| 6,442,890 B1 * | 9/2002 | Creeger | A01M 1/00 | 43/131 |
| 6,445,301 B1 * | 9/2002 | Farrell | A01M 31/002 | 340/384.2 |
| 6,718,688 B2 * | 4/2004 | Garretson | A01M 1/026 | 43/111 |
| 6,865,843 B1 * | 3/2005 | Jordan, Sr. | A01M 23/12 | 43/139 |
| 7,051,472 B1 * | 5/2006 | Kelly | A01M 1/023 | 43/58 |
| 7,317,399 B2 * | 1/2008 | Chyun | A01M 1/026 | 340/286.01 |
| 7,530,195 B2 * | 5/2009 | Muller | A01M 23/12 | 43/58 |
| 7,540,109 B2 * | 6/2009 | Hall | A01M 23/20 | 43/58 |
| 7,958,668 B2 * | 6/2011 | Walter | A01M 23/16 | 43/58 |
| 8,359,783 B1 * | 1/2013 | Kamery | A01M 23/18 | 43/61 |
| 8,387,305 B2 * | 3/2013 | Cink | A01M 25/004 | 43/131 |
| 9,877,471 B2 * | 1/2018 | Takacs | A01N 25/004 | |
| 2004/0244274 A1 * | 12/2004 | Dellevigne | A01M 25/004 | 43/131 |
| 2006/0150470 A1 * | 7/2006 | Ronnau | A01M 1/026 | 43/58 |
| 2011/0226921 A1 * | 9/2011 | Patterson | A01M 25/004 | 248/346.03 |
| 2011/0258907 A1 * | 10/2011 | Endepols | A01M 25/004 | 43/131 |
| 2012/0279110 A1 * | 11/2012 | Finotello | A01M 25/004 | 43/131 |
| 2013/0031824 A1 * | 2/2013 | Arlichson | A01M 23/18 | 43/60 |
| 2013/0174469 A1 * | 7/2013 | Kittelson | A01M 23/18 | 43/61 |
| 2013/0333273 A1 * | 12/2013 | Esculier | A01M 23/02 | 43/58 |
| 2014/0283435 A1 * | 9/2014 | Galeb | A01M 23/005 | 43/107 |
| 2017/0318796 A1 * | 11/2017 | Vaisblat | A01M 31/002 | |
| 2017/0354139 A1 * | 12/2017 | Vickery | A01M 23/005 | |
| 2017/0360026 A1 * | 12/2017 | Zirkle | A01M 25/004 | |
| 2018/0271085 A1 * | 9/2018 | Sorensen | A01M 31/002 | |
| 2018/0325092 A1 * | 11/2018 | Round | A01M 23/12 | |
| 2019/0037829 A1 * | 2/2019 | Laut | A01M 31/002 | |

FOREIGN PATENT DOCUMENTS

| | | | | |
|---|---|---|---|---|
| CA | 2984693 A1 * | 10/2016 | | A01M 25/004 |
| CA | 3022366 A1 * | 12/2017 | | A01M 25/004 |
| GB | 2333437 A | 7/1999 | | |
| GB | 2391159 A | 2/2004 | | |
| GB | 2391159 A * | 2/2004 | | A01M 25/004 |
| KR | 100863112 B1 * | 10/2008 | | |
| WO | WO-9520873 A1 * | 8/1995 | | A01M 25/004 |
| WO | WO-0230189 A1 * | 4/2002 | | A01M 23/16 |
| WO | WO-2004008848 A1 * | 1/2004 | | A01M 1/026 |
| WO | WO-2007068971 A1 * | 6/2007 | | A01M 23/18 |
| WO | WO-2007147550 A1 * | 12/2007 | | A01M 25/004 |
| WO | WO-2008034725 A1 * | 3/2008 | | A01M 1/2011 |
| WO | WO-2010074585 A1 * | 7/2010 | | A01M 25/00 |
| WO | WO-2012120263 A1 * | 9/2012 | | A01M 25/004 |
| WO | WO-2014013108 A3 * | 3/2014 | | A01M 25/004 |
| WO | WO-2016034419 A1 * | 3/2016 | | A01M 25/002 |
| WO | WO-2016116079 A1 * | 7/2016 | | A01M 25/002 |
| WO | WO-2016166011 A1 * | 10/2016 | | A01M 25/004 |
| WO | WO-2017153494 A1 * | 9/2017 | | A01M 23/08 |
| WO | WO-2017184791 A1 * | 10/2017 | | A01K 5/008 |
| WO | WO-2017188828 A1 * | 11/2017 | | A01M 23/14 |
| WO | WO-2017207479 A1 * | 12/2017 | | A01M 25/004 |

* cited by examiner

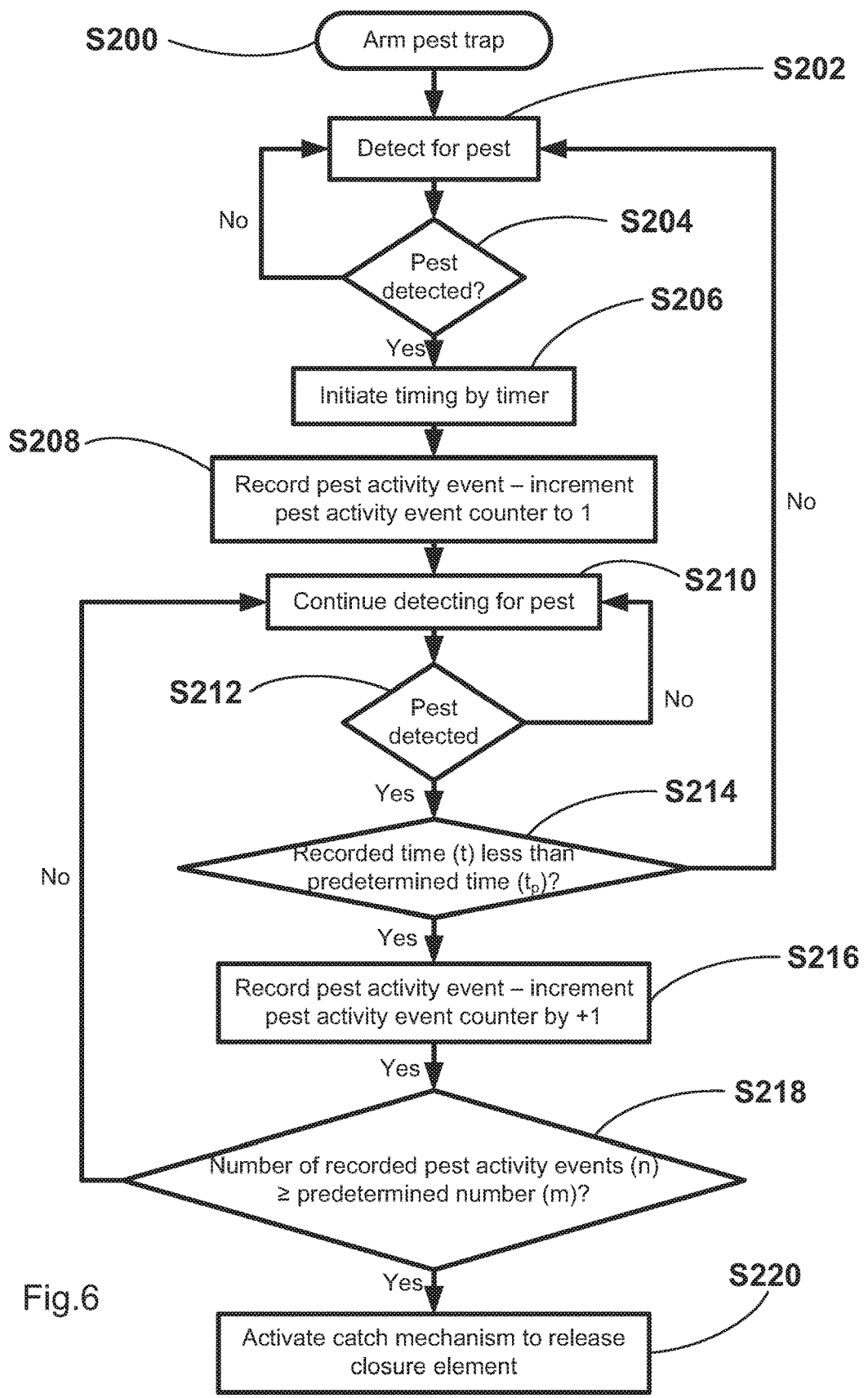

BAIT STATION FOR PEST CONTROL

CROSS-REFERENCE TO RELATED APPLICATIONS

The present application is a national stage application of PCT Patent Application No. PCT/GB2014/052723, filed Sep. 9, 2014, which claims priority to UK Patent Application No. 1322424.1 filed Dec. 18, 2013, the contents of each of which are hereby incorporated by reference in their entireties.

BACKGROUND OF THE DISCLOSURE

1. Field of the Disclosure

The present invention relates to a bait station for pest control and, particularly, but not exclusively, to a bait station for use in controlling rodent infestations.

2. Description of Related Art

A known method of pest control includes the use of substances which are harmful to the pest (e.g. poisons) and which, if ingested by the pest, result in extermination of the pest. Further known methods of pest control include the use of a trap to trap and retain a pest for later release in an area remote from the location of capture. Also, traps may be employed for the simultaneous trapping and extermination of a pest.

These methods however exhibit disadvantages. In particular, the use of poisonous substances has the drawback that animals (such as domestic pets or livestock), or indeed humans, may unintentionally ingest the poisonous substance. Also, there typically may be poisonous residues left by rodents which have been exterminated using poison. These poisonous residues may be detrimental to the environment. Further, there are certain environments where the use of poison is impractical, or even forbidden (e.g. in food-preparation environments).

A popular method of pest control, particularly for rodent control, is the use of a spring-loaded trap in combination with bait. When a pest, such as a rodent, attempts to obtain the bait, a spring-loaded arm/lever is triggered to trap and (usually) exterminate the pest simultaneously.

However, such traps may be triggered inadvertently by humans or domestic animals causing failure of their intended purpose and possible injury to, for example, the domestic pet concerned. Also, such traps can be unsanitary because blood (and possibly other bodily fluids) and/or bacteria from the pest body may be released into the environment and may be passed from the trapped pest to the trap, and from there may be passed on to a user setting the trap.

Further, such traps are considered to be inhumane as they may only injure the pest, or trap the pest by a limb, and thus cause the pest pain and possibly a drawn-out death.

There are also known pest control devices which operate using a combination of the above methods of poisoning and trapping. These types of device comprise a housing in which can be located bait which has been poisoned and which acts to lure the rodent into the housing. The housing is configured so as retain a body of the pest after it has consumed the poisonous bait and been exterminated. Such devices may be suitable for use in commercial environments having large areas where pest control contractor visits to each trap (e.g. to empty the trap) are infrequent and where it is necessary to conceal the body of the pest from the surrounding environment. Hereinafter, these types of pest control devices will be referred to as "baited traps".

In providing a pest control service, a contractor is generally required to provide regular service visits to a client's premises in order to inspect for the presence of any pests and to carry out any pest control measures found to be necessary. As an example, a pest control technician might normally visit a client once every four to eight weeks for this purpose although a substantial number of these visits may result in no further pest control measures being required.

In the event that evidence of pest activity is discovered during the interval between service visits, a client may have the option to request an additional visit from a pest control technician in order to address the problem. However, especially in premises which are not continuously occupied or continually inspected, a pest could conceivably be at large and undetected for some time between routine visits. This may have drawbacks because even a relatively temporal incidence of pest infestation may has the potential of causing severe problems such as the spreading of disease or otherwise damaging the client's business.

Baited trap types of pest control device referred to above, generally have an open configuration. Thus, species other than a target pest species (hereinafter "non-target species") may access a trap of this type. In some instances, these non-target species may ingest the poisonous bait. A particular problem observed in open baited traps which are intended to target rodents is that gastropods (such as slugs) enter the trap and damage the bait. An additional problem observed in open baited traps is that, by their very nature, the trap (and consequently the bait) is left open to the elements. This can cause degradation of and/or damage to the bait through exposure to the weather conditions in the environment where the trap is located.

Currently, to combat degradation of and/or damage to the bait, baited traps are inspected as part of a pest control contractor's regular service visits. If bait is degraded and/or damaged, then it may be replaced as required during one of these service visits. As will be appreciated, however, replacing damaged/degraded bait may prove costly.

In addition to the above considerations, it is the case that some countries have regulations which do not permit the laying of bait (such as in an open baited trap) unless there are signs of an active pest infestation. During periods of no pest activity, previously laid open bait traps must be removed from a location. Open bait traps can only be re-laid in that location if pest infestation returns, and again only for the duration of the active pest infestation.

It will be appreciated that there may be a delay between disappearance of a pest infestation and removal by a pest control contractor of the open bait traps from a location where they were laid to combat the infestation. Also, should the pest infestation return to that location, there may be a delay between noticing that the pest infestation has returned and the re-distribution of open baited traps to that location.

Whilst the above-described pest traps and methods of pest control may have been satisfactory and may continue to be satisfactory for certain situations it would be desirable to reduce a time delay between a pest infestation commencing and treatment of the pest infestation. Furthermore, it would be desirable to provide a pest infestation treatment method which reduces the reliance on manual interpretation of signs of a potential pest infestation problem. Additionally, it would be desirable to provide a baited trap or bait station which can be left in environments even when there is no sign of an active pest infestation. Such a baited trap or bait station would be suitable to meet the regulations of those countries which do not permit the laying of baited traps or bait stations unless there are signs of an active pest infestation. Also, it would be desirable to provide a pest infestation treatment method which could be effective in short-term incidences of pest infestation in which activity does not persist for any great length of time and which activity may go unnoticed due to the time period between inspections by a pest control contractor. Further, it would be desirable to provide a baited trap or bait station in which bait is concealed during times of no pest activity or during times of non-target species activity, but which can reveal the bait only when there is a target pest infestation.

Aspects and embodiments of the present invention have been devised with the foregoing considerations in mind.

SUMMARY OF THE DISCLOSURE

According to an aspect of the present invention, there is provided a bait station for pest control, comprising: an enclosure defining an access chamber and a bait chamber, the access chamber including at least one entry port for permitting entry of a pest into the enclosure, and the bait chamber configured to hold therein a bait product harmful to a pest; a partition section separating the access chamber and the bait chamber, wherein the bait chamber is accessible from the access chamber via an access port formed in the partition section; a closure element associated with the access port and controllable for movement between a first position in which the access port is covered, and in which the bait chamber is concealed from the access chamber, and a second position in which the access port is uncovered; a detector arrangement capable of detecting presence of a pest in the access chamber and operative to output a signal indicative of presence or otherwise of a pest; a controller operative to receive the signal indicative of presence or otherwise of a pest from the detector arrangement and further operative to record a pest activity event upon receipt of a signal indicative of presence of a pest; wherein responsive to occurrence of a number of recorded pest activity events at least equal to a predetermined number, the controller is operative to implement movement of the closure element from the first position to the second position to open the access port between the access chamber and the bait chamber.

The presence of a partition in the bait station between the access chamber and the bait chamber where a bait product is held can conceal the bait chamber from the access chamber (when the closure element is in a first, closed, position). In this respect, the bait station can be considered to be a "non-baited" bait station because a bait product located in the bait chamber is concealed therein from the access chamber by the partition. However, upon the occurrence of pest activity or an increase in the level of pest activity, the controller of the bait station can "trigger" the bait station so that the closure element is opened to reveal the access port and thus reveal the bait chamber. Thus, the bait station effectively is converted to a "baited" bait station when pest activity is detected.

The above bait station may be suitable for use in those countries having regulations which prohibit the laying of bait (such as in an open bait trap) unless there are signs of an active pest infestation. The bait station can be placed in a non-baited state at a location and still be compliant with the regulations. However, should pest activity occur, the bait station can detect such activity and convert to a baited state to combat the pest infestation. Again, the bait station should be compliant with the regulations in the baited state because it would have been triggered by pest activity, i.e. an indication of an active pest infestation.

The ability of the bait station to convert from a non-baited state to a baited state may reduce the reliance of pest control contractors upon their clients noticing and reporting evidence of pest activity. Also, an infestation could potentially be treated even if it occurs between scheduled visits by a pest control contractor. The bait station may reduce delays between commencement of pest activity indicative of a pest infestation and treatment of the pest infestation.

Optionally, the enclosure may be configured to allow opening thereof. This can allow a pest control technician to open the bait station for inspection purposes.

Optionally, the enclosure may comprise a base portion and a lid portion, the lid portion and base portion arranged to cooperatively engage to enclose a volume which forms the access chamber and the bait chamber. Further optionally, the lid portion and base portion may comprise a one or two-part construction. Yet further optionally, the lid portion and base portion may be hingedly attached to each other.

A one-part construction may commonly employ a "live hinge", i.e. a strip of moulded plastic formed between a base portion and a lid portion of the enclosure which flexes sufficiently to allow the lid portion to swing open whilst remaining attached to the base portion. Therefore, optionally, the hinge is an integral part of a housing of the bait station and is formed from the same material as the housing.

If a live-hinge is employed, the entire bait station, i.e. the housing (comprising the base portion and the lid portion) and the hinge, can be formed by way of a single moulding process and thus the trap may be formed as a unitary moulded unit.

Two-part enclosures may employ clipped hinges between the base portion and lid portion, or the base and lid portion are arranged to be pressed together using a friction fit.

The access chamber may form a tunnel section with an entry port at both ends thereof.

Optionally, the closure element may be operative for slidable movement relative to the partition and to the access port formed in the partition from the first position to the second position and vice versa.

Optionally, the bait station may further comprise a catch mechanism arranged to engage the closure element to retain the closure element in the first position when the bait station is in an untriggered state. Further optionally, the catch mechanism may be operative, responsive to receipt of a control signal issued by the controller upon determination by the controller that a number of recorded pest activity events is at least equal to a predetermined number, to disengage the closure element for permitting movement of the closure element to the second position. Yet further optionally, the catch mechanism may be coupled to an actuating arrangement (such as an electric motor or a solenoid) operative to disengage the catch mechanism from the closure element responsive to receipt of a control signal issued by the controller upon determination by the controller that a number of recorded pest activity events is at least equal to a predetermined number.

Optionally, the bait station may comprise an actuating arrangement directly coupled to the closure element and operative to control movement of the closure element between the first and second positions. Further optionally, the bait station may comprise a sensor element operative to detect a position of the closure element and wherein the actuating arrangement is operative to control movement of the closure element responsive to a position signal output by the sensor element.

Optionally, the bait station may further comprise biasing means arranged to urge the closure element to the second position.

Optionally, the detector arrangement may comprise at least one electro-optic emitter/detector pair located within the access chamber such that an electromagnetic radiation beam between each of the at least one emitter/detector pairs extends transversely across the access chamber, and operative to output the signal indicative of presence of a pest when the pest passes through the electromagnetic radiation beam. Further optionally, the at least one electro-optic emitter/detector pair may be located at a position spaced from a floor of the access chamber. Yet further optionally, the bait station may comprise two electro-optic emitter/detector pairs spaced apart longitudinally within the access chamber. Optionally, the electro-optic emitter/detector pairs may comprise infrared devices.

Optionally, the controller may be operative to record a pest activity event only upon receipt of a signal indicative of presence of a pest from both electro-optic emitter/detector pairs simultaneously.

By spacing apart two electro-optic emitter/detector pairs, the detector arrangement may provide for selective triggering of the bait station. The emitter/detector pairs can be set apart to cause the controller to determine that a target pest is within the access chamber only when both emitter/detector pairs indicate presence of a pest. This would be an indication that a pest greater than a certain length (e.g. ≥the distance between the two emitter/detector pairs) is within the access chamber. Thus, the bait station may not be triggered inadvertently by a non-target species pest, (e.g. a smaller pest which enters the trap).

Optionally, the detector arrangement may comprise a pressure sensor operative to output the signal indicative of presence of a pest when a pest exerts pressure thereon. Further optionally, the pressure sensor is arranged to output the signal indicative of presence of a pest only when a pressure equivalent to a pest weight of a predetermined amount is exerted on the pressure sensor.

Like the employment of two pairs of electro-optic emitter/detector pairs set at a specific distance apart, the use of pressure sensors may provide for selective triggering of the bait station. The pressure sensors can be set to cause a detection signal to be sent to the controller only when a pest greater than a certain weight (e.g. >70 grams) passes over the pressure sensor. Thus, the trap may not be triggered inadvertently by a non-target species pest.

Optionally, the detector arrangement may comprise a sensor (e.g. a touch-sensitive sensor) operative to be activated when a pest touches the sensor and thus indicate the presence of a pest in the access chamber. In an optional arrangement, the touch-sensitive sensor may comprise a microswitch.

Optionally, the bait station may comprise a timer operative to be initiated by the controller when the controller receives a signal indicative of presence of a pest in the trap. Further optionally, the controller may be operative to monitor an elapsed time recorded by the timer from initiation and, responsive to occurrence of a number of recorded pest activity events at least equal to a predetermined number within an elapsed time less than a predetermined period, operates to implement movement of the closure element from the first position to the second position to open the access port between the access chamber and the bait chamber.

This arrangement may allow the bait station to be triggered only when a certain number of pest activity events occur within a predetermined period, for example, two pest activity events in one week. Thus, if there is a one-off instance of a pest traversing the access chamber, this may not be considered to be evidence of a pest infestation and may only be a temporary incident of pest activity. The bait station can therefore be configured so that one-off pest activity events may be ignored, but more regular and numerous pest activity events may cause triggering of the bait station.

Optionally, the controller may be operative to initiate return of the closure element to the first position following a period of pest inactivity. Therefore, the bait station can be configured to return to a non-baited state from a baited state if frequency of pest activity decreases and/or if there is no pest activity for a predetermined period of time.

Optionally, an output from the timer may be coupled to a visual display operative to display time elapsed from initiation of the timer. This provides a pest control technician with a visual indication of the time elapsed from the first pest activity event.

Optionally, the bait station may further comprise an indicator operative to indicate occurrence of pest activity responsive to receipt of a signal transmitted by the controller upon determination by the controller that a number of recorded pest activity events is at least equal to a predetermined number. Further optionally, the indicator may be operative to generate an audible and/or visible signal for indicating pest activity.

Optionally, the bait station may further comprise a transmitter operative to transmit a data signal indicative of pest activity to a remote location. Reporting the state of the bait station and/or pest activity to a remote location, e.g. such as a pest control contractor's premises, can notify the pest control contractor that there is pest control activity at a particular site. The pest control contractor can, upon notification, take action and attend the site to check bait levels in the bait station and replace if required. Optionally, the bait station may further comprise a receiver operative to receive data from the remote location. Optionally, data may be provided to the bait station from the remote location, via the receiver, to change parameters in the device, for example, such as disabling the device.

Optionally, the indicator may be configured to extend through an aperture formed in the enclosure. Optionally, the indicator may be configured to extend through the at least one entry port of the bait station.

Optionally, the bait station may further comprise an integral power source for powering elements of the bait station.

Optionally, the partition may be an integral part of the enclosure.

Optionally, the partition may be removable from the enclosure. Such a partition may be suitable for retrofitting to existing bait stations.

Optionally, the controller and/or the detector arrangement and/or the closure element may be located on the partition. Further optionally, at least one of: the catch mechanism; the actuating arrangement; the timer; the visual display; the indicator; and the power source may be located on the partition.

According to another aspect of the present invention, there is provided a partition for a bait station comprising an enclosure including at least one entry port for permitting entry of a pest into the enclosure, the partition comprising: a planar element configured for location within the enclosure and arranged to define, when so located, an access chamber leading to the at least one entry port and a bait chamber for holding therein a bait product harmful to a pest; an access port formed in the planar element and arranged to provide communication between the access chamber and the bait chamber; a closure element associated with the access port and controllable for movement between a first position in which the access port is covered, and in which the bait chamber is concealed from the access chamber, and a second position in which the access port is uncovered; a detector arrangement capable of detecting presence of a pest in the access chamber and operative to output a signal indicative of presence or otherwise of a pest; a controller operative to receive the signal indicative of presence or otherwise of a pest from the detector arrangement and further operative to record a pest activity event upon receipt of a signal indicative of presence of a pest; wherein responsive to occurrence of a number of recorded pest activity events at least equal to a predetermined number, the controller is operative to implement movement of the closure element from the first position to the second position to open the access port between the access chamber and the bait chamber.

Such a partition may be suitable for retrofitting to existing bait stations and may provide the effects discussed above.

Optionally, the closure element may be operative for slidable movement relative to the partition and to the access port formed in the partition from the first position to the second position and vice versa.

The partition may further comprise a catch mechanism arranged to engage the closure element to retain the closure element in the first position when a bait station in which the partition is located is in an untriggered state. Optionally, the catch mechanism may be operative, responsive to receipt of a control signal issued by the controller upon determination by the controller that a number of recorded pest activity events is at least equal to a predetermined number, to disengage the closure element for permitting movement of the closure element to the second position. Further optionally, the catch mechanism may be coupled to an actuating arrangement (e.g. an electric motor or solenoid) operative to disengage the catch mechanism from the closure element responsive to receipt of a control signal issued by the controller upon determination by the controller that a number of recorded pest activity events is at least equal to a predetermined number.

Optionally, the partition may further comprise biasing means arranged to urge the closure element to the second position.

Optionally, the detector arrangement may comprise at least one electro-optic emitter/detector pair (e.g. infrared devices) configured such that an electromagnetic radiation beam between each the at least one emitter/detector pair extends transversely across the access chamber, and operative to output the signal indicative of presence of a pest when the pest passes through the electromagnetic radiation beam. Further optionally, the at least one electro-optic emitter/detector pair may be arranged for detection at a position spaced from a floor of the access chamber. Yet further optionally, the partition may comprise two electro-optic emitter/detector pairs configured for detection at positions spaced apart longitudinally. Optionally, the controller is operative to record a pest activity event only upon receipt of a signal indicative of presence of a pest from both electro-optic emitter/detector pairs simultaneously.

Optionally, the detector arrangement may comprise a pressure sensor operative to output the signal indicative of presence of a pest when a pest exerts pressure thereon. Further optionally, the pressure sensor may be arranged to output the signal indicative of presence of a pest only when a pressure equivalent to a pest weight of a predetermined amount is exerted on the pressure sensor.

Optionally, the partition may further comprise a timer operative to be initiated by the controller when the controller receives a signal indicative of presence of a pest in the trap. Further optionally, the controller may be operative to monitor an elapsed time recorded by the timer from initiation and, responsive to occurrence of a number of recorded pest activity events at least equal to a predetermined number within an elapsed time less than a predetermined period, operates to implement movement of the closure element from the first position to the second position to open the access port between the access chamber and the bait chamber. Yet further optionally, an output from the timer may be coupled to a visual display located on the partition, the visual display operative to display time elapsed from initiation of the timer.

Optionally, the partition may further comprise an indicator operative to indicate occurrence of pest activity responsive to receipt of a signal transmitted by the controller upon determination by the controller that a number of recorded pest activity events is at least equal to a predetermined number. Further optionally, the indicator may be operative to generate an audible and/or visible signal for indicating pest activity.

Optionally, the partition may further comprise a transmitter operative to transmit a data signal indicative of pest activity to a remote location.

Optionally, the partition may further comprise an integral power source for powering elements of the partition.

According to another aspect of the present invention, there is provided a receiver device for receiving a data signal indicative of pest activity from a bait station, or from a partition, as described above and hereinafter.

According to yet another aspect of the present invention, there is provided a bait station and pest activity reporting system comprising a bait station as described above and hereinafter, and a receiver device as described above and hereinafter.

Optionally, the bait station and pest activity reporting system may comprise a bait station comprising the partition as described above and hereinafter, and a receiver device as described above and hereinafter.

According to a further aspect of the present invention, there is provided a method of operation of a bait station, the bait station comprising an enclosure defining an access chamber and a bait chamber, the access chamber including at least one entry port for permitting entry of a pest into the enclosure, and the bait chamber configured to hold therein a bait product harmful to a pest, wherein the bait chamber is accessible from the access chamber via an access port formed in a partition section separating the access chamber and the bait chamber, the method comprising the steps of: detecting, using a detector arrangement of the bait station, presence of a pest in the access chamber; outputting, from the detector arrangement, a signal indicative of presence or otherwise of a pest; receiving, at a controller of the bait station, the signal indicative of presence or otherwise of a pest; recording a pest activity event upon receipt, by the controller, of a signal indicative of presence of a pest, wherein responsive to occurrence of a number of recorded pest activity events at least equal to a predetermined number, implementing movement of a closure element associated with the access port from a first position in which the access port is covered, and in which the bait chamber is concealed from the access chamber, to a second position to open the access port between the access chamber and the bait chamber.

Optionally, the method may further comprise retaining the closure element in the first position by a catch mechanism when the bait station is in an untriggered state.

Optionally, the method may further comprise disengaging the catch mechanism from the closure element for permitting movement of the closure element to the second position responsive to receipt of a control signal issued by the controller upon determination by the controller that a number of recorded pest activity events is at least equal to a predetermined number.

Optionally, the method may further comprise urging, by biasing means, the closure element to the second position.

Optionally, the method may further comprise providing, as the detector arrangement, at least one electro-optic emitter/detector pair located within the access chamber such that an electromagnetic radiation beam between each the at least one emitter/detector pair extends transversely across the access chamber, and outputting, from the at least one electro-optic emitter/detector pair, the signal indicative of presence of a pest when the pest passes through the electromagnetic radiation beam.

Optionally, the method may further comprise providing two electro-optic emitter/detector pairs (e.g. infrared devices) spaced apart longitudinally within the access chamber.

Optionally, the method may further comprise recording a pest activity event only upon receipt of a signal indicative of presence of a pest from both electro-optic emitter/detector pairs simultaneously.

Optionally, the method may further comprise providing, as the detector arrangement, a pressure sensor operative to output the signal indicative of presence of a pest when a pest exerts pressure thereon.

Optionally, the method may further comprise outputting, from the pressure sensor, the signal indicative of presence of a pest only when a pressure equivalent to a pest weight of a predetermined amount is exerted on the pressure sensor.

Optionally, the method may further comprise providing a timer, and initiating timing by the timer when the controller receives a signal indicative of presence of a pest in the trap.

Optionally, the method may further comprise monitoring, by the controller, an elapsed time recorded by the timer from initiation and, responsive to occurrence of a number of recorded pest activity events at least equal to a predetermined number within an elapsed time less than a predetermined period, implementing movement of the closure element from the first position to the second position to open the access port between the access chamber and the bait chamber.

Optionally, the method may further comprise outputting a signal from the timer to a visual display, and displaying, by the visual display, time elapsed from initiation of the timer.

Optionally, the method may further comprise indicating, by an indicator, occurrence of pest activity responsive to receipt of a signal transmitted by the controller upon determination by the controller that a number of recorded pest activity events is at least equal to a predetermined number.

Optionally, the method may further comprise generating, in the indicator, an audible and/or visible signal for indicating pest activity.

Optionally, the method may further comprise providing a transmitter, and transmitting a data signal indicative of pest activity to a remote location.

According to another aspect of the present invention, there is provided a computer program comprising computer program elements operative in a computer processor to implement one or more aspects of a method as described above and hereinafter.

According to another aspect of the present invention, there are provided processor implementable instructions operative in a computer processor to implement one or more aspects of a method as described above and hereinafter.

According to another aspect of the present invention, there is provided a computer readable medium carrying a computer program as described above and hereinafter, or processor implementable instructions as described above and hereinafter.

BRIEF DESCRIPTION OF THE DRAWINGS

One or more embodiments of the present invention are described further hereinafter, by way of example only, with reference to the accompanying drawings in which:

FIG. 6 is a process flow diagram illustrating steps carried out in a mode of operation of the bait station of FIGS. 1 to 3 in an optional arrangement.

DETAILED DESCRIPTION OF THE DISCLOSURE

Figure 1:
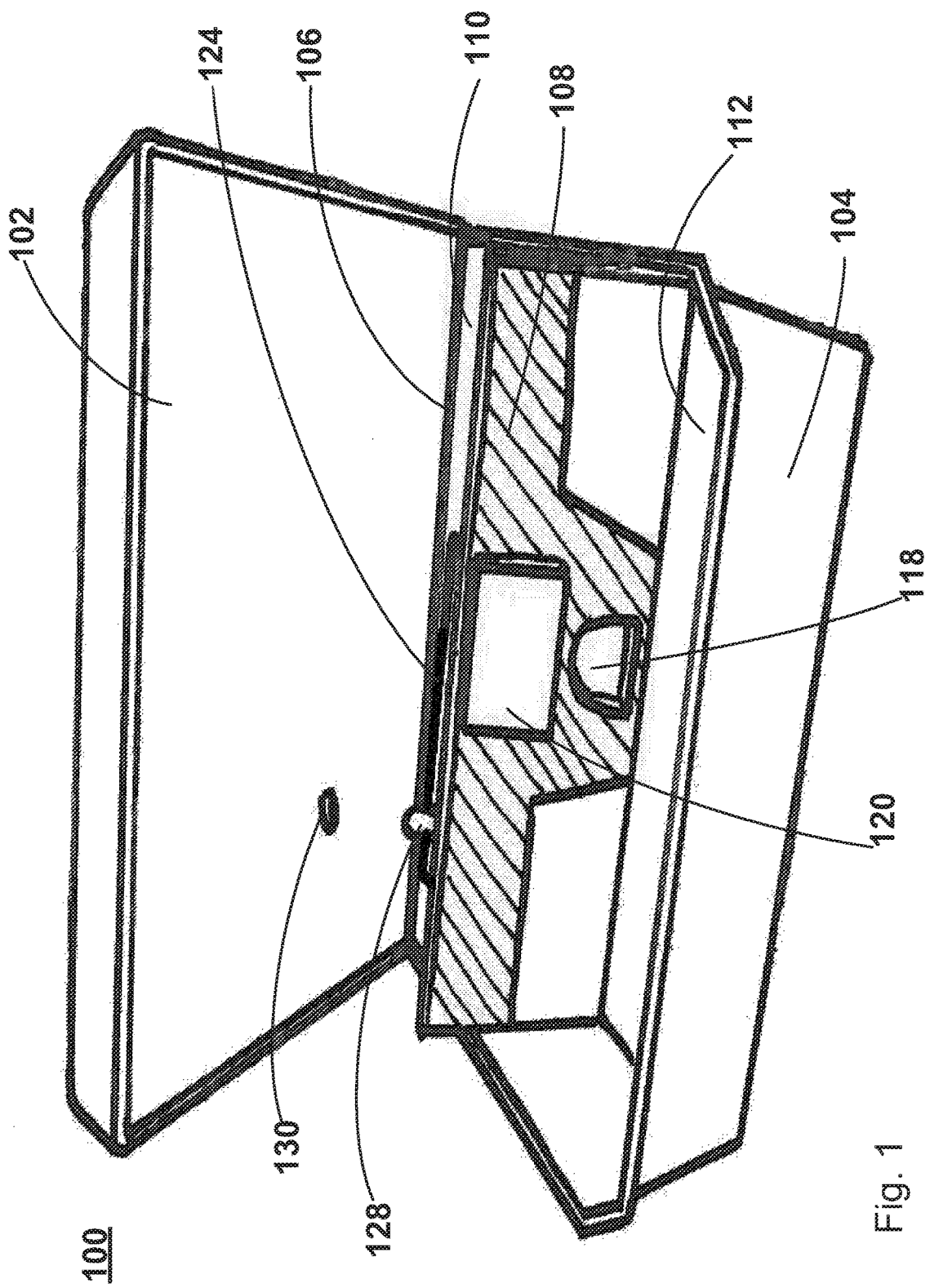
FIG. 1 illustrates a perspective view of a bait station in an open state.
Figure 2:
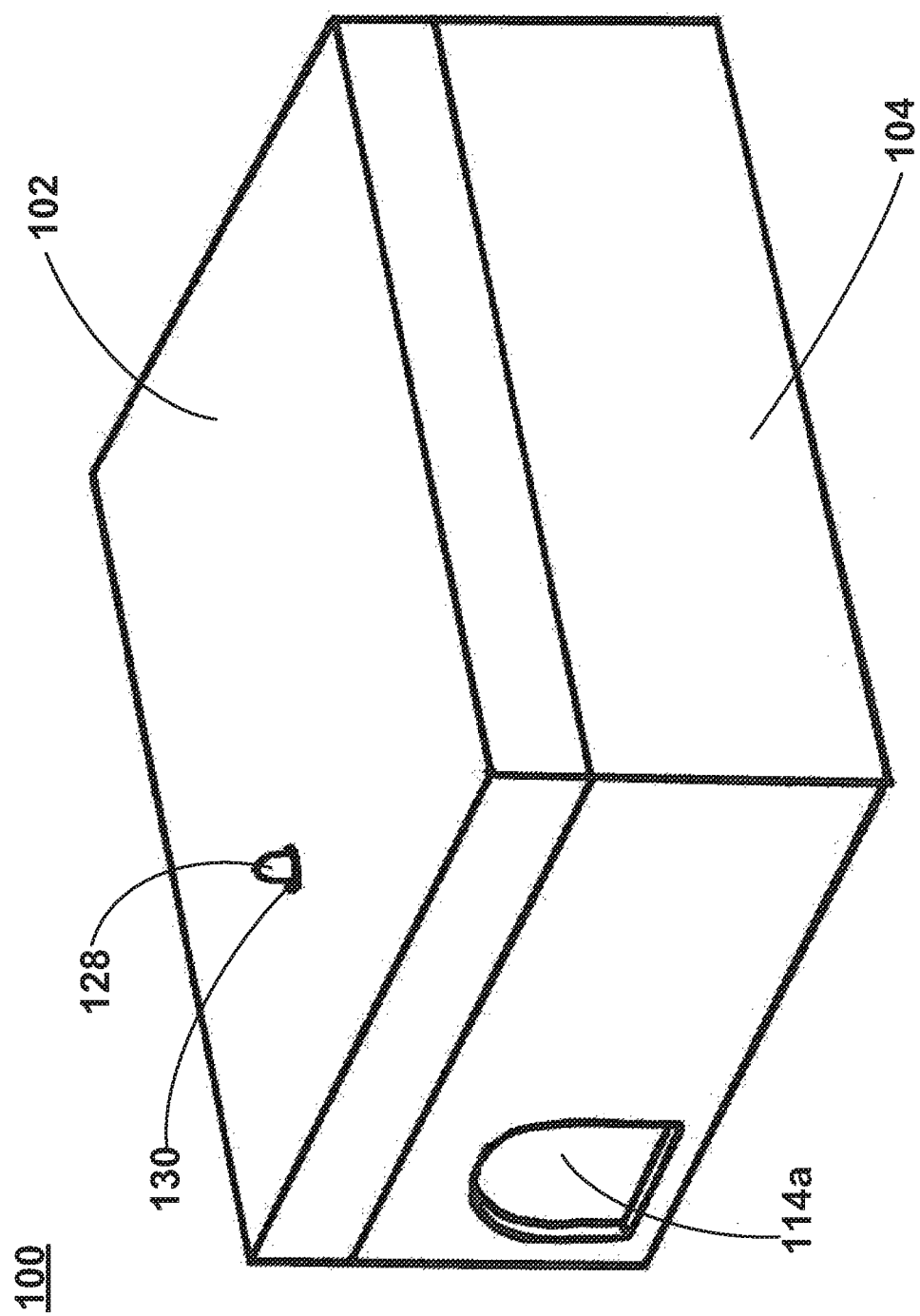
FIG. 2 illustrates a perspective top view of the bait station of FIG. 1 in a closed state.
Figure 3:
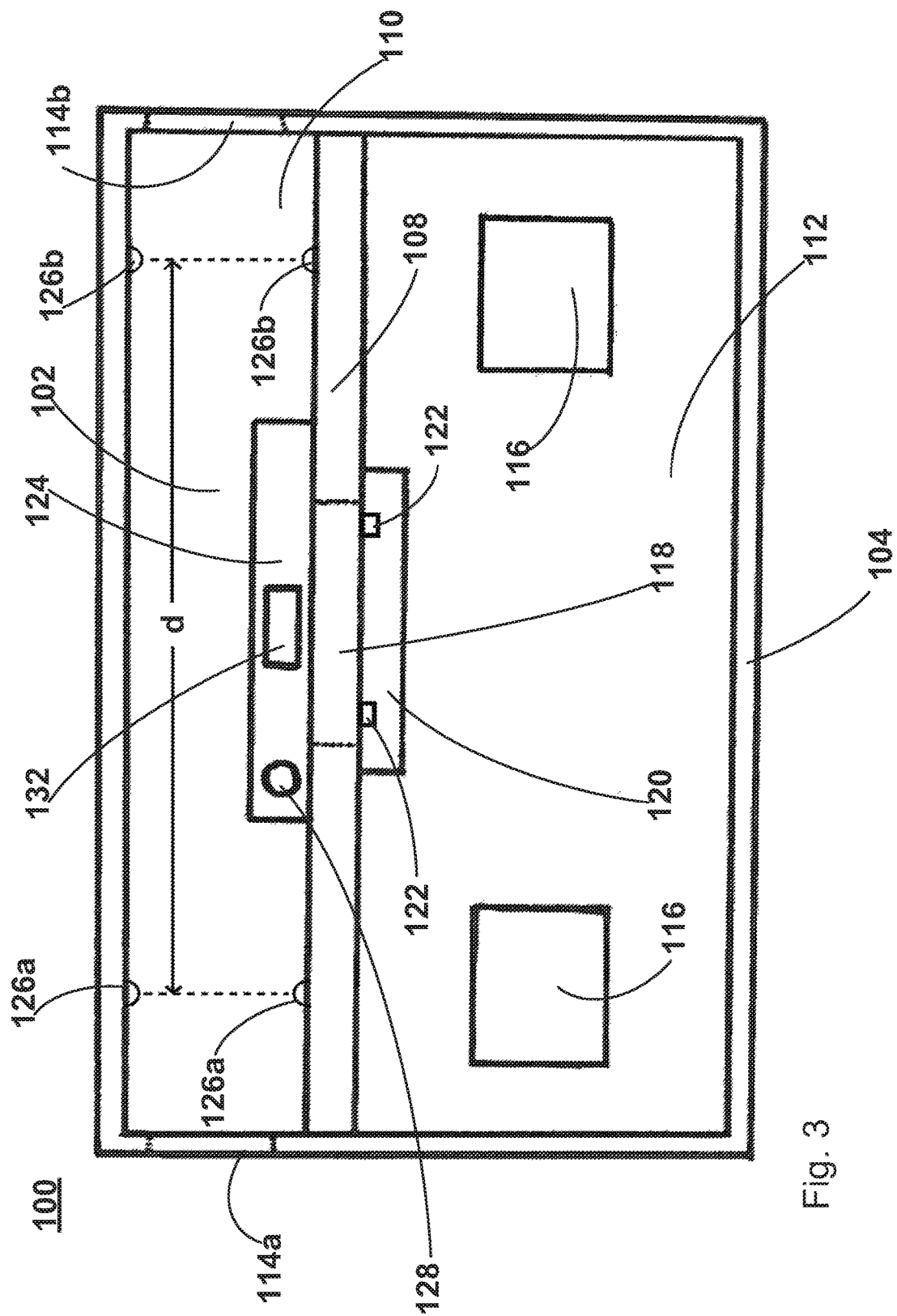
FIG. 3 illustrates a plan view of an interior of the bait station of FIGS. 1 and 2.

In relation to the figures, FIG. 1 illustrates a perspective view of a bait station 100 in an open state, FIG. 2 illustrates a perspective top view of the bait station 100 in a closed state, and FIG. 3 illustrates a plan view of an interior of the bait station 100.

Referring now to FIGS. 1 to 3, the bait station 100 comprises a housing, which is formed from lid portion 102 (shown in FIGS. 1 and 2, but not FIG. 3) and a base portion 104. Lid portion 102 and base portion 104 are, in one or more embodiments, connected by a hinge arrangement 106 (shown in FIG. 1 only) provided in the region of adjacent longitudinal edges of the lid and base portions 102, 104.

With such a configuration, the lid and base portions 102, 104 combine to resemble a "clam-shell". The hinge 106 allows the housing to be opened to gain access to the interior thereof.

In the illustrated embodiment, the bait station comprises 100 a one-part construction with a live-hinge. In this arrangement, contacting edges of lid and base portions 102, 104 are arranged such that when the bait station 100 is in a closed condition, such edges are in engagement (optionally sealing engagement) with one another.

A partition 108 comprising a planar element is located in the bait station 100 and extends between opposing lateral walls of the bait station 100. The partition 108 is located and configured to separate the interior volume of the bait station housing into an access chamber 110 and a bait chamber 112 (shown in FIGS. 1 and 3, but not FIG. 2).

In a first lateral wall of the bait station 100, there is formed a first entry port 114a (see FIGS. 2 and 3). Similarly, in an opposing second lateral wall of the bait station 100, there is formed a second entry port 114b (see FIG. 3). The first and second entry ports 114a, 114b are in communication with and provide access to the access chamber 110. The partition 108 forms one longitudinal wall of the access chamber 110 and a first longitudinal wall of the base portion 104 forms an opposite longitudinal wall of the access chamber 110. Opposing end walls of the access chamber 110 are formed by first portions of the first and second lateral walls of the bait station 100. The first and second entry ports 114a, 114b are formed in these first portions of the first and second lateral walls of the bait station 100. The partition 108, first longitudinal wall of the base portion 104, a portion of the lid portion 102 above the access chamber 110, and the first and second entry ports 114a, 114b formed in the portions of the first and second lateral walls of the bait station 100, combine to form a tunnel-like section in the bait station 100 which defines the access chamber 110.

The first and second entry ports 114a, 114b can allow a pest to access the access chamber 110 of the rodent trap 100.

The partition 108 also forms one longitudinal wall of the bait chamber 112. A second longitudinal wall of the base portion 104 forms an opposite longitudinal wall of the bait chamber 112, and opposing end walls of the bait chamber 112 are formed by second portions of the first and second lateral walls of the bait station 100.

The bait chamber 112 is employed to hold a bait product harmful to a pest.

Optionally, the bait chamber 112 comprises regions therein, namely bait location regions 116 (see FIG. 3), which are configured to receive and/or retain a bait product harmful to a pest.

Partition 108 is formed with an access port 118 which can allow a pest to access the bait chamber 112 from the access chamber 110. A closure element 120 is provided in the bait station 100 and is associated with the access port 118. The closure element 120 is operative to move between a first, closed, position and a second, open position. In the first, closed position, the closure element 120 covers the access port 118 and the bait chamber 112 is concealed from the access chamber 110. Thus, access to the bait chamber 112 by a pest in the access chamber 110 is not possible with the closure element in the first, closed, position. With the closure element 120 in this position, the bait station 100 is in an "untriggered" state (not shown in FIGS. 1 to 3). The closure element 120 is movable to the second, open, position to uncover the access port 118. When in the second, open, position, the access port 118 is revealed and the bait chamber 112 is accessible from the access chamber 110 by a pest. With the closure element 120 in the second, open, position, the bait station 100 is in a "triggered" state (see FIG. 1).

In the illustrated arrangement, the closure element 120 is mounted on the partition 108 and is arranged for slidable movement relative thereto from the first, closed, position, to the second, open, position, and vice versa.

The closure element 120 is held in the first, closed, position by a catch mechanism (not shown). This catch mechanism is controlled by a controller (not shown in FIGS. 1 to 3) and an actuating arrangement (not shown in FIGS. 1 to 3).

The closure element 120 is urged to the second, open, position, from the first, closed, position by a biasing member or members 122 (see FIG. 3). The catch mechanism (not shown) resists the influence of the biasing member 122 on the closure element 120 when the closure element 120 is in the first, closed, position. However, when the bait station 100 is triggered, the controller (not shown) controls the actuating arrangement (not shown) to cause the catch mechanism (not shown) to disengage from the closure element 120. In this disengaged state, the closure element 120 is free to move to the second, open, position under the influence of the biasing member 122.

The bait station further comprises a component housing 124 which serves to enclose a number of the operational components of the bait station 100. Housing the operational components in this manner may prevent damage being caused to those operational components by pests.

The bait station 100 further comprises first and second detector arrangements 126a, 126b (not shown in FIGS. 1 and 2—see FIG. 3). These first and second detector arrangements 126a, 126b are arranged within the bait station 100 to detect for the presence of a pest in the access chamber 110. The first and second detector arrangements 126a, 126b are electronically coupled to the controller (not shown) so that signals output by the first and second detector arrangements 126a, 126b can be communicated to the controller.

The first and second detector arrangements 126a, 126b are arranged to detect at locations which are spaced apart from each other by a distance, d. This distance, d, may be set so as to be approximately equivalent to the length of a particular pest species (e.g. the average length of a pest in a target species). In this way, the bait station 100 can be configured to detect for the presence of a particular pest species only (i.e. a target pest species) and may be triggered only when a target pest species is present in the access chamber 110. Instances of the presence of other pest species (i.e. non-target pest species) may be ignored.

In this arrangement, the bait station 100 may be triggered only when both the first and second detector arrangements 126a, 126b simultaneously detect the presence of a pest in the access chamber 110. Therefore, in this arrangement, the bait station 100 is triggered when a pest of length at least equivalent to distance, d, is present in the access chamber 110. Smaller/shorter pests (i.e. those having a length less than distance, d) will not trigger the bait station in this arrangement because, due to their shorter length, they will not be detected by both the first and second detector arrangements 126a, 126b at the same time.

In the arrangement illustrated in FIG. 3, the first and second detector arrangements 126a, 126b comprise electro-optic emitter/detector pairs. The electro-optic emitter of each pair is operative to emit an electromagnetic radiation beam toward its corresponding electro-optic detector. The electromagnetic radiation beam between each emitter/detector pair extends transversely across the access chamber 110. Thus, when a pest passes between an emitter and its corresponding detector, the electromagnetic radiation beam will be broken. The fall in intensity of electromagnetic radiation received by the detector affects the signal output by the detector. The controller is operative to monitor the output signals of both detectors, and if a change in output signal of both detectors occurs simultaneously, the controller interprets this as the presence of a target pest species in the access chamber 110 and triggers the bait station 100 (i.e. initiates movement of the closure element 120 to the second, open position, to reveal the bait chamber 112).

In an optional arrangement, the controller may trigger the bait station 100 only if further conditions are met in addition to those above. These further conditions will be discussed further below.

The bait station also comprises an indicator 128 for indicating that the bait station 100 has been triggered by a target pest species. The indicator 128 is optional in one or more embodiments of the present invention and has associated therewith an aperture 130 formed in the lid portion 102 of the bait station 100. When the bait station 100 is in the closed condition (see FIG. 2), the indicator 128 is visible through aperture 130. The indicator 128 is electronically coupled to the controller (not shown) and is operative to receive a control signal from the controller.

Optionally, the indicator 128 may comprise, for example, a light emitting diode which is operative for illumination when the bait station 100 is triggered such that a visual alert is displayed to indicate that the bait station 100 has been triggered. Further optionally, the indicator 128 may comprise an alarm for emitting an audible alert when the bait station has been triggered.

Optionally, the bait station may further comprise a transmitter for sending an alert signal to a remote monitoring station.

Optionally, the bait station 100 further comprises a visual display 132 for displaying information regarding the status of the bait station 100 to an operator. The type of information displayed will be described in more detail further below.

Figure 4A:
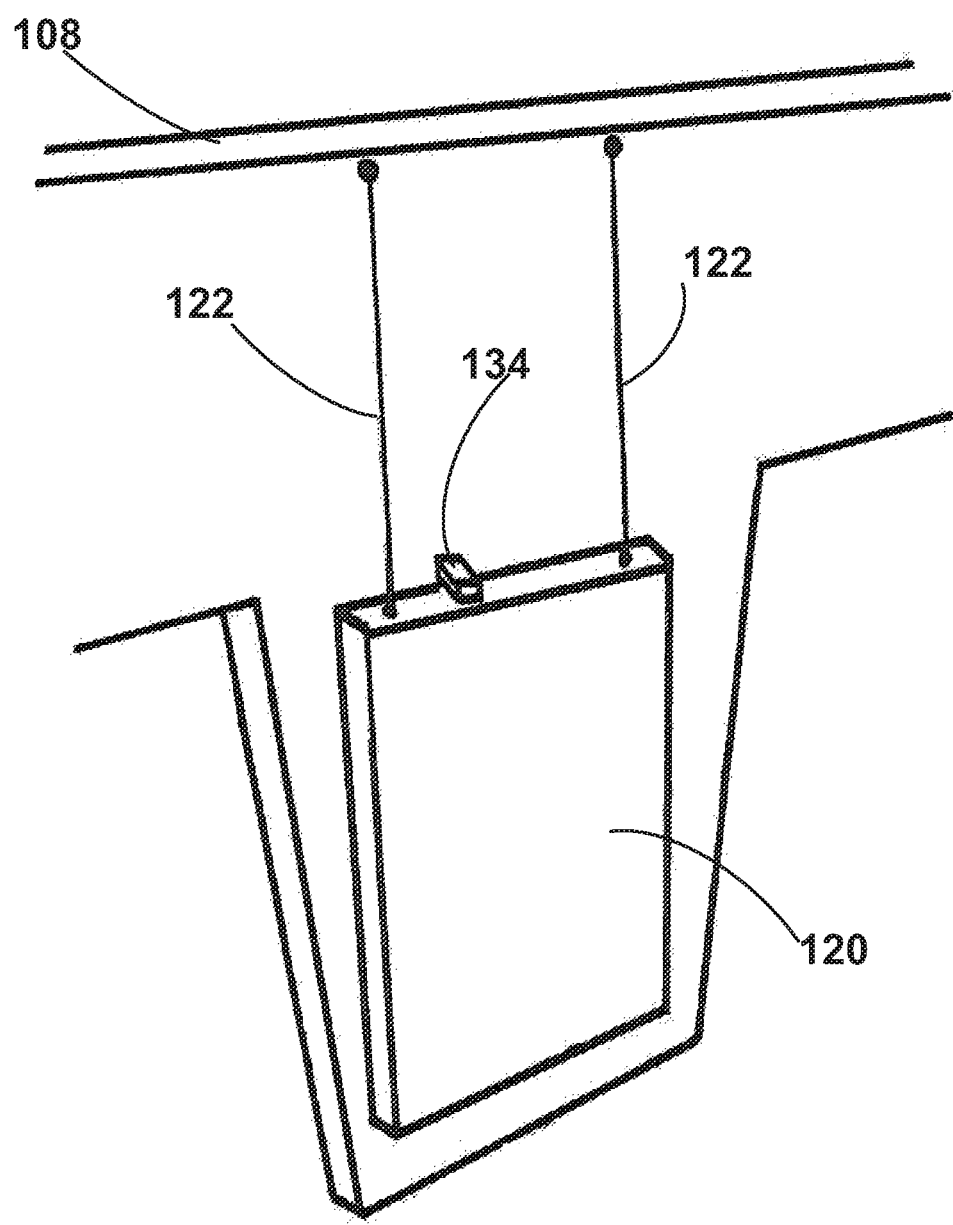
FIGS. 4a and 4b illustrate enlarged perspective views of a partition of the bait station of FIGS. 1 to 3 when the bait station is in an untriggered state (FIG. 4a) and a triggered state (FIG. 4b)
Figure 4B:
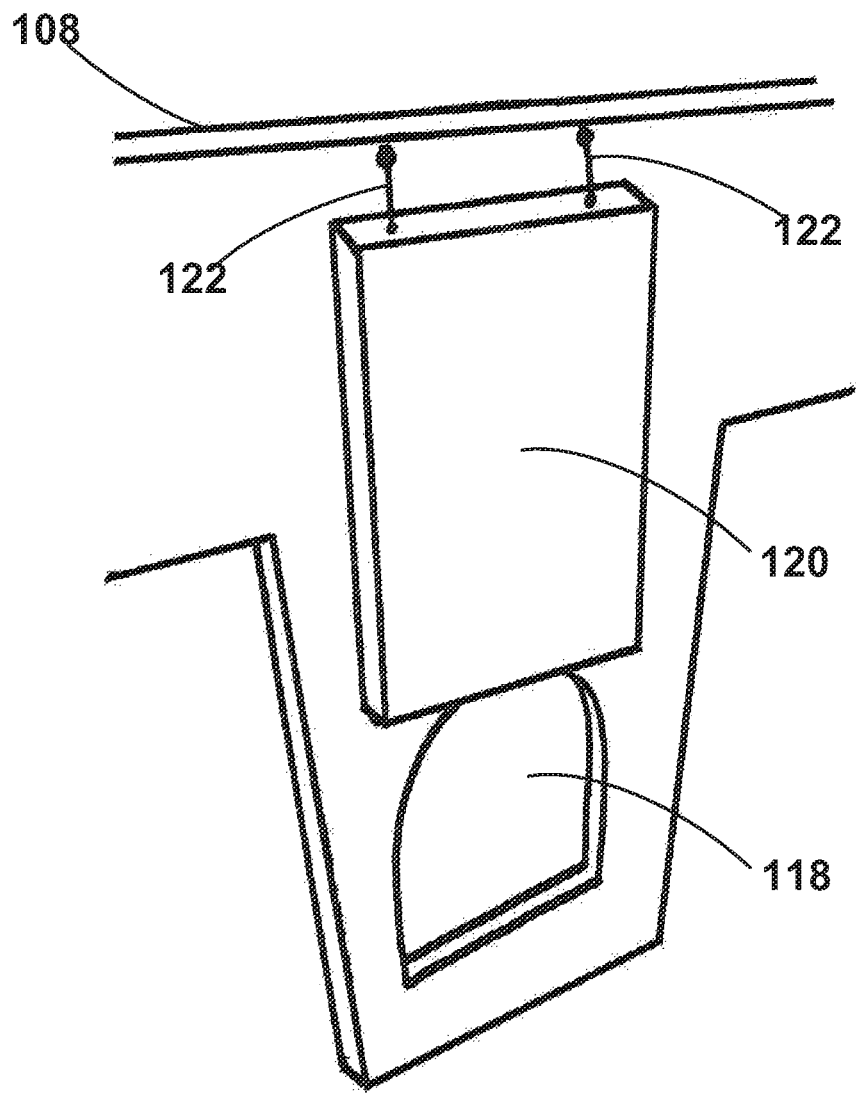

FIGS. 4a and 4b illustrate enlarged perspective views of the partition 108 when the bait station is in an untriggered state (i.e. the closure element 120 is in the first, closed, position—see FIG. 4a) and when the bait station is in a triggered state (i.e. the closure element 120 is in the second, open, position—see FIG. 4b). Features illustrated in FIGS. 4a and 4b which are common to the bait station 100 illustrated in FIGS. 1 to 3 (and as described above) are denoted using like reference numerals.

As can be seen from FIG. 4a, catch mechanism 134 is located on the partition 108 and, in the illustrated "engaged" position, extends from the partition 108 for engagement with a region of the closure element 120.

The biasing members 122 comprise helical springs of which ends thereof are connected to the partition 108. The other ends of the helical springs are connected to the closure element 120. When the closure element 120 is held in the first, closed, position through interaction with the catch mechanism 134, the helical springs are in tension. Upon movement of the catch mechanism 134 from the engaged position (as illustrated) to a "disengaged" position, i.e. when the bait station is triggered, the tension in the helical springs is released, thereby causing the closure element 120 to move to the second, open position as shown in FIG. 4b.

Figure 5:
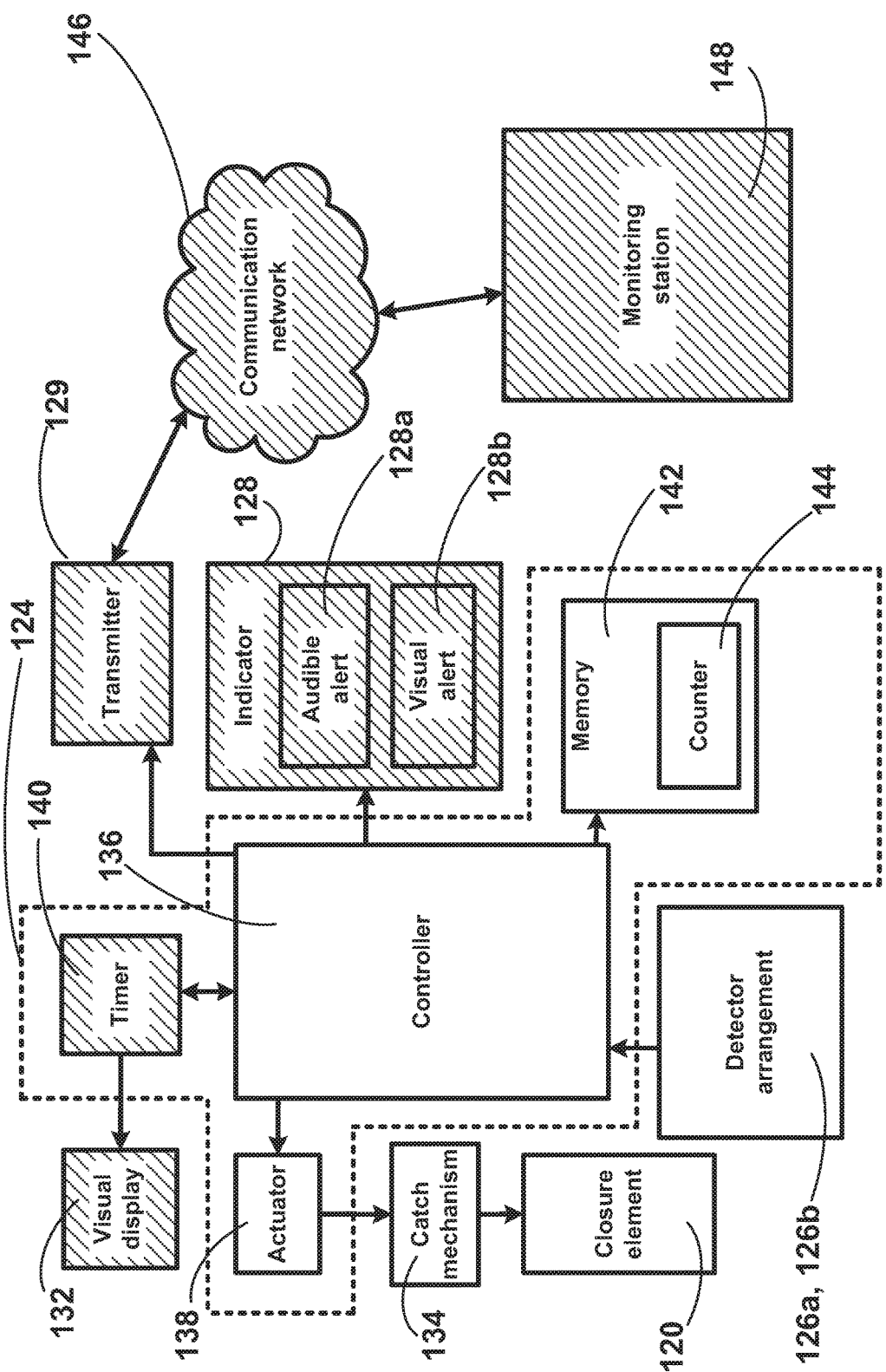
FIG. 5 is a block diagram schematically illustrating elements of the bait station of FIGS. 1 and 3.

FIG. 5 schematically illustrates in more detail the component housing 124 of FIGS. 1 and 3 and the operational components of the bait station 100. Features illustrated in FIG. 5 which are common to the bait station 100 illustrated in FIGS. 1 to 3, 4a and 4b (and as described above) are denoted using like reference numerals.

In FIG. 5, the illustrated operational components which are shaded with diagonal stripes are optional components.

The housing 124 has located therein a controller 136 operative to control operation of the bait station 100. The controller 136 is operative to receive signals output by the first and second detector arrangements 126a, 126b. Those signals are indicative of presence or otherwise of a pest in the access chamber 110 of the bait station 100.

The controller 136 is electronically coupled to an actuator 138 (also housed within housing 124). The actuator 138 is operative, responsive to control signals received from the controller 136, to control the position of the catch mechanism 134, i.e. to move the catch from the engaged position to the disengaged position.

The controller 136 is also electronically coupled to a timer module 140 which, in turn, is electronically coupled to the visual display 132.

The controller 136 is further electronically coupled to a memory 142 (e.g. ROM and/or RAM) which contains instructions for implementation by the controller 136 for operation of the bait station 100. The memory 142 also serves as a data store for storing data relating to operation of the bait station 100. Furthermore, the controller 136 is operative to implement a counter module, and data arising from the implementation of the counter module is also stored in a portion of the memory 142 (i.e. in counter 144).

As illustrated, the indicator 128 may comprise any one or more of a an audible alert module 128a and a visual alert module 128b. The bait station may also comprise a transmitter 129. The controller 136 is electronically coupled to these operational components, when present, and is operative to communicate control and/or output signals to these components. For example, the visual alert module 128b may be activated to provide a visual indication that the bait station has been triggered, responsive to receipt of a control signal from the controller 136. In another example, the audible alert module 128a may be activated to provide an audible indication that the bait station has been triggered, responsive to receipt of a control signal from the controller 136. In yet another example, the transmitter 129 may be activated to transmit a signal to a remote location that the bait station has been triggered, responsive to receipt of a control signal from the controller 136. The signal transmitted to a remote location may be transmitted from the transmitter 129 via a communications network 146 to a monitoring station 148. The monitoring station 148 may be located at, for example, a pest control contractor premises. Thus, the transmission of the signal to the monitoring station 148 may provide a means for relaying information regarding the status of the bait station to a pest control contractor.

Turning now to the mode of operation of the bait station, and referring to FIGS. 1 to 5, in one or more embodiments of the present invention the bait station 100 is arranged to be triggered when a target pest species enters the access chamber 110. That is, when a target pest species enters the access chamber 110, the closure element 120 (which is, initially, in a first, closed, position covering the access port 118) is moved to the second, open, position to reveal the bait chamber 112. When the bait chamber 112 is revealed in this manner, the pest can enter the bait chamber 112 from the access chamber 110 via access port 118 and gain access to any bait product located in the bait chamber 112.

A pest can enter the access chamber 110 via one of the entry ports 114a, 114b. As the pest traverses the access chamber 110, it will pass through the electromagnetic radiation beam extending between one of the emitter/detector pairs 126a, 126b. By continuing its movement through the access chamber 110, the pest may pass through the electromagnetic radiation beam extending between the other of the emitter/detector pairs 126b, 126a. If the length of the pest is greater than the distance, d, between the two emitter/detector pairs 126a, 126b, then as the pest traverses the access chamber 110, there will be a period of time when portions of the pest body break both electromagnetic radiation beams extending between the two emitter/detector pairs 126a, 126b.

The controller 136, upon receipt of signals indicative of presence of a pest from both emitter/detector pairs 126a, 126b simultaneously, is operative to issue a control signal to the actuator 138 to "trigger" the bait station 100. Upon receipt of the signal, the actuator 138 operates to move the catch mechanism 134 from the engaged position to the disengaged position.

With the catch mechanism 134 in the disengaged position, the closure element 120 is no longer restrained in the first, closed, position and is free to move under the influence of biasing members 122 to the second, open, position. This movement of the closure element 120 changes the state of the bait station 100 from an untriggered state to a triggered state.

Once the closure element 120 has moved to the second, open, position, the bait chamber 112 is revealed and the pest can enter the bait chamber 112 via access port 118.

FIG. 6 is a process flow diagram illustrating steps carried out in a mode of operation of the bait station in an optional arrangement.

As an initial step (S200), the bait station is armed by: manually connecting the electronic operational components to a power source (e.g. coupling the components to an on-board power source such as a battery); and manually moving the closure element to the first, closed, position (if not already located in such a position). These operations may be carried out by a pest control technician.

With the initial arming step complete, the emitter/detector pairs 126a, 126b of the bait station 100 operate (S202) to detect for the presence of a pest in the access chamber 110. Signals output by the detector elements of each emitter/detector pair 126a, 126b are communicated to the controller 136. The controller 136 is operative to determine (S204), based upon the signals received from the detector elements, whether or not a pest is present in the access chamber 110. If no pest is present, then detection continues (S202). However, if the controller 136 determines that a pest is present in the access chamber 110, it is operative to issue a control signal to timer 140 (see FIG. 5) to initiate timing (S206) by the timer 140. Also, the controller 136 is operative to instruct the counter module 144 to increment a pest activity event counter from 0 to 1 (S208).

Detection for a pest continues (S210) and again, the controller 136 is operative to determine (S212), based upon the signals received from the detector elements, whether or not a pest is present in the access chamber 110. Again, if no pest is present, then detection continues (S210). However, if the controller 136 determines that a pest is present in the access chamber 110, it is operative to send a request to the timer 140 for the elapsed time, t since the first pest activity event was recorded (i.e. time elapsed since initiation of timing by the timer).

Responsive to receipt of the request, the timer 140 provides the elapsed time to the controller 136 which, in turn, compares (S214) the elapsed time, t, to a predetermined time, $t_p$. If the elapsed time, t, is greater than the predetermined time, $t_p$, the controller 136 is operative to reset all recorded data and the process returns to step S202. However, if the elapsed time, t, is greater than the predetermined time, $t_p$, the controller 136 is operative to record a further pest activity event by sending an instruction to the counter module 144 to increment the pest activity event counter by +1 (S216). The controller 136 then retrieves from the counter module 144 the count value stored in the counter module 144. This value is indicative of the number of recorded pest activity events, n. Upon retrieval of the number of recorded pest activity events, n, the controller 136 is operative to compare (S218) a value of n with a predetermined number, m. If the value, n, is less than the predetermined value, m, the controller 136 is operative to continue the detection process (i.e. the process returns to step S210). However, if the value, n, is at least equal to the predetermined value, m, the controller 136 is operative to trigger the bait station 100. The controller 136 initiates the triggering of the bait station 100 by issuing a control signal to the actuator 138 to control the actuator 138 to cause the catch mechanism 134 to become activated (S220). Activation of the catch mechanism 134 causes the catch mechanism 134 to move from the engaged position to the disengaged position. Once the catch mechanism 134 is in the disengaged position, the closure element 120 is no longer restrained and is free to move to the second, open position under the influence of biasing members 122.

Optional steps which may be implemented by the controller 136 in optional arrangements of one or more embodiments of the present invention may be as follows:

upon triggering of the bait station 100, providing a control signal to an audible alert module 128a and/or a visual alert device 128b to control operation of one or both of these devices to cause them to issue audible/visible alerts indicating that the bait station 100 has been triggered; and upon triggering of the bait station 100, providing to a transmitter 129 a signal indicating that the bait station 100 has been triggered, the signal being communicated, via communications network 146, to a remote monitoring station 148.

Another optional step which may be implemented in an optional arrangement of one or more embodiments of the present invention is that an elapsed time value, t, as recorded by timer 140, is displayed by a visual display 132 of the bait station 100. The visual display 132 is coupled to an output of the timer 140 and may, for example, comprise a seven-segment LED display operative to display a number of days (and/or weeks and/or months) since a first pest activity event was detected.

Figure 7A:
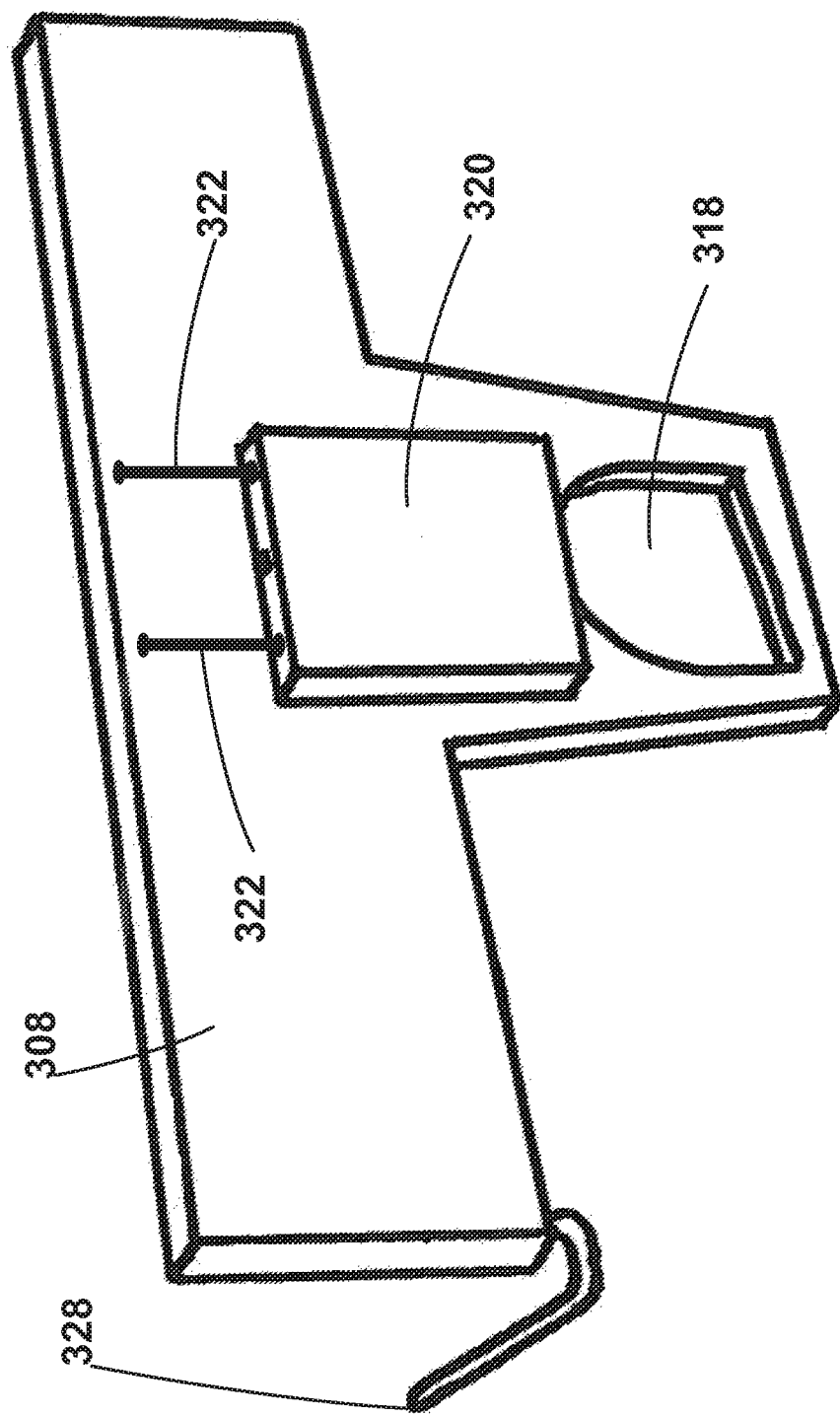
FIGS. 7a and 7b illustrate perspective views from a first direction and a second direction respectively of a partition for a bait station in an optional arrangement of one or more embodiments of the present invention.
Figure 7B:
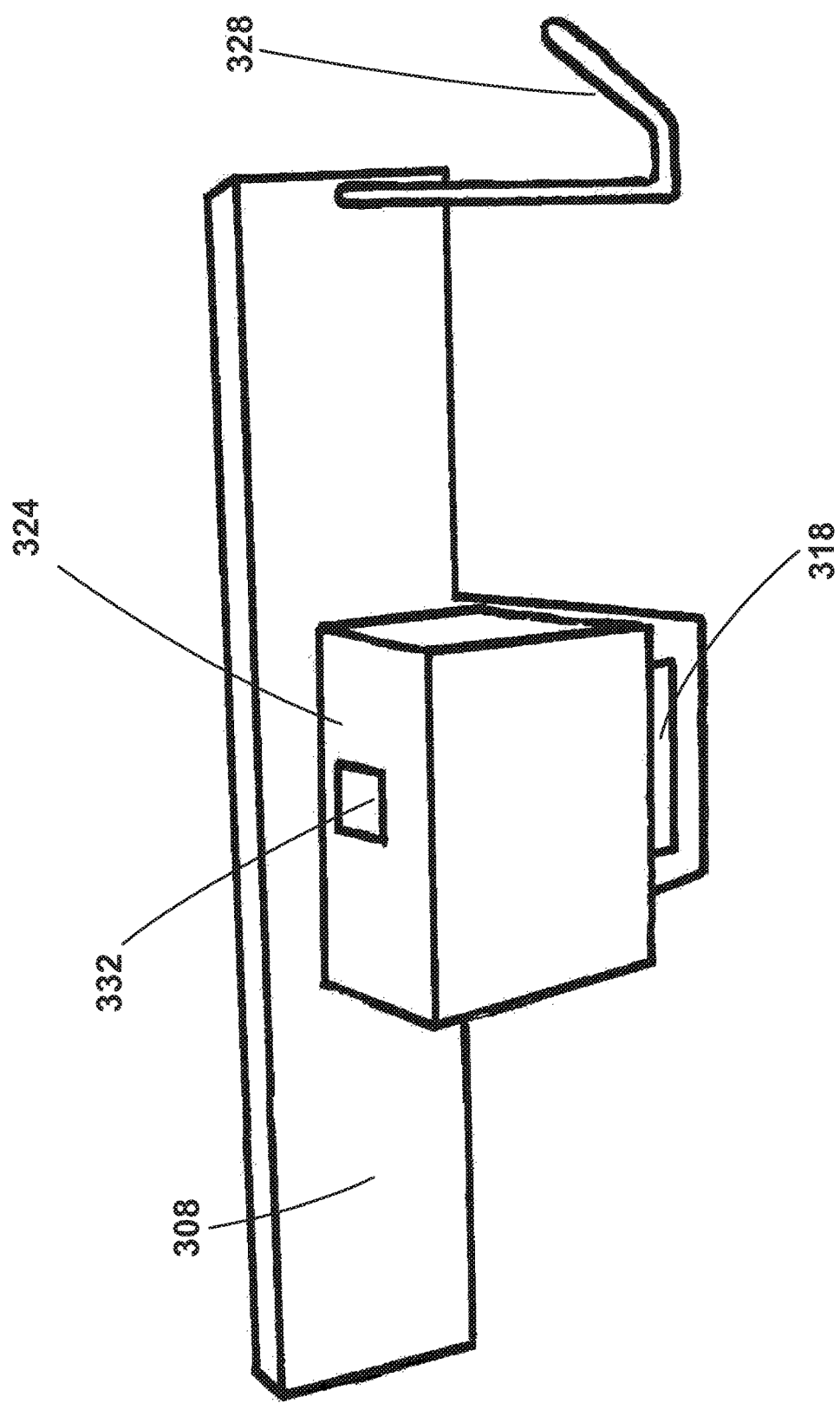

FIGS. 7a and 7b illustrate perspective views from a first direction and a second direction respectively of a pest-trap partition in an optional arrangement of one or more embodiments of the present invention. The partition is configured for location in a conventional bait station, i.e. the partition can be retrofitted to an existing bait station.

Features similar to those illustrated in FIGS. 1 to 5 are also illustrated in FIGS. 7a and 7b. However, in FIGS. 7a and 7b, the features common with those of FIGS. 1 to 5 are designated with reference numerals of the type 3XX rather than 1XX. Thus, in FIGS. 7a and 7b, the partition is denoted by reference number 308 (rather than 108), the access port, by reference number 318 (rather than 118) and so on.

The partition 308 illustrated in FIGS. 7a and 7b differs from the partition 108 previously described (and as illustrated in FIGS. 1 to 5) in that the configuration of indicator 328 differs from that of indicator 128 described earlier.

As noted above, the partition 308 as illustrated in FIGS. 7a and 7b may be suitable for retrofitting in an existing, conventional bait station. Such a bait station may not be configured with an aperture for receiving an indicator and so the indicator 328 of partition 308 is configured so as to extend through one of the entry ports of the bait station. In this regard, the indicator 328 is mounted on a stalk which extends from the partition 308, the stalk being of sufficient length to allow the indicator to protrude from the entry port of the bait station when the partition 308 is located in the bait station. Thus, a visible alert displayed by the indicator 328 would be viewable by a person inspecting the bait station.

In the above described one or more embodiments, the biasing members 122 (or 322) comprise helical springs. However, in optional arrangements of one or more embodiments of the present invention other types of mechanisms may be employed for urging the closure element 120 (or 320) to the second, open position.

In optional arrangements of one or more embodiments of the present invention, a two-part enclosure is employed. The two-part enclosure may comprise clipped hinges between the base portion and lid portion, or the base and lid portion may be arranged to be pressed together using a friction fit.

Although the above described one or more embodiments of the present invention describe a specific combination of features residing inside and outside the housing 124 (or 324), other combinations of features may reside inside and outside the housing in optional arrangements.

In optional arrangements of one or more embodiments of the present invention, the emitter/detector pairs may be located at a specific height from the floor of the access chamber. In locating the emitter/detector pairs in this manner, smaller pest species will pass under the electromagnetic radiation beams extending between the emitter/detector pairs and so will not trigger the bait station if they are present in the access chamber. This may allow the bait station to be configured to target larger pest species, but remain unaffected by smaller, non-target, pest species.

In another optional arrangement of one or more embodiments of the present invention, there may be provided a reset button to allow an operator to reset the bait station. In a particular optional arrangement, such a reset button may be located on the housing 124 (or 324). Other locations for the reset button are also envisaged.

In the above described one or more embodiments of the bait station, the described means for detecting the presence of a pest within the access chamber of the bait station comprise electro-optic emitter/detector pairs. However, in an optional arrangement the electro-optic emitter/detector pairs may be replaced by or supplemented by pressure pads. The pressure pads may be located in a floor section of the access chamber and may be operative to be activated when a pest exerts pressure thereon.

Like the two pairs of electro-optic emitter/detector pairs set at a distance, d, apart, the use of pressure pads may provide for selective triggering of the bait station. The pressure pads can be set to cause a detection signal to be sent to the controller only when a pest greater than a certain weight (e.g. >70 grams) passes over the pressure pads. Thus, the trap will not be inadvertently triggered by a non-target species pest, for instance, a smaller pest which enters the trap.

Any references made herein to orientation (e.g. top, bottom, upper, lower, front, back, left and right) are made for the purposes of describing relative spatial arrangements of the features of the apparatus, and are not intended to be limiting in any sense.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the terms "a" or "an" are employed to describe elements and components of the invention. This is done merely for convenience and to give a general sense of the invention. This description should be read to include one or at least one and the singular also includes the plural unless it is obvious that it is means otherwise.

In view of the foregoing description it will be evident to a person skilled in the art that various modifications may be made within the scope of the invention. For example, embodiments in accordance with the invention are not limited to any of the particular materials disclosed herein. Other materials suitable for performing the function described herein for a particular material may also be utilized in embodiments of the invention.

Yet further aspects and embodiments of the invention are enumerated with reference to the following numbered clauses.

1. A bait station for pest control, comprising:
    an enclosure defining an access chamber and a bait chamber, said access chamber including at least one entry port for permitting entry of a pest into said enclosure, and said bait chamber configured to hold therein a bait product harmful to a pest;
    a partition section separating said access chamber and said bait chamber, wherein said bait chamber is accessible from said access chamber via an access port formed in said partition section;
    a closure element associated with said access port and controllable for movement between a first position in which said access port is covered, and in which said bait chamber is concealed from said access chamber, and a second position in which said access port is uncovered;
    a detector arrangement capable of detecting presence of a pest in said access chamber and operative to output a signal indicative of presence or otherwise of a pest;
    a controller operative to receive said signal indicative of presence or otherwise of a pest from said detector arrangement and further operative to record a pest activity event upon receipt of a signal indicative of presence of a pest;
    wherein responsive to occurrence of a number of recorded pest activity events at least equal to a predetermined number, said controller is operative to implement movement of said closure element from said first position to said second position to open said access port between said access chamber and said bait chamber.

2. A bait station according to clause 1, wherein said enclosure is configured to allow opening thereof.

3. A bait station according to clause 1 or 2, wherein said enclosure comprises a base portion and a lid portion, said lid portion and base portion arranged to cooperatively engage to enclose a volume which forms said access chamber and said bait chamber.

4. A bait station according to clause 3, wherein said lid portion and base portion are hingedly attached to each other.

5. A bait station according to any one of the preceding clauses, wherein said access chamber forms a tunnel section with an entry port at both ends thereof.

6. A bait station according to any one of the preceding clauses, wherein said closure element is operative for slidable movement relative to said partition and to said access port formed in said partition from said first position to said second position and vice versa.

7. A bait station according to any one of the preceding clauses, further comprising a catch mechanism arranged to engage said closure element to retain said closure element in said first position when said bait station is in an untriggered state.

8. A bait station according to clause 7, wherein said catch mechanism is operative, responsive to receipt of a control signal issued by said controller upon determination by the controller that a number of recorded pest activity events is at least equal to a predetermined number, to disengage said closure element for permitting movement of said closure element to said second position.

9. A bait station according to clause 7 or 8, wherein said catch mechanism is coupled to an actuating arrangement operative to disengage said catch mechanism from said closure element responsive to receipt of a control signal issued by said controller upon determination by the controller that a number of recorded pest activity events is at least equal to a predetermined number.

10. A bait station according to any one of clauses 1 to 6, further comprising an actuating arrangement directly coupled to the closure element and operative to control movement of the closure element between the first and second positions.

11. A bait station according to clause 10, further comprising a sensor element operative to detect a position of the closure element and wherein the actuating arrangement is operative to control movement of the closure element responsive to a position signal output by the sensor element.

12. A bait station according to any one of clauses 9 to 11, wherein said actuating arrangement comprises an electric motor.

13. A bait station according to clause 9, wherein said actuating arrangement comprises a solenoid.

14. A bait station according to any one of clauses 1 to 9, or clauses 12 and 13 when dependent upon any one of clauses 1 to 9, further comprising biasing means arranged to urge said closure element to said second position.

15. A bait station according to any one of the preceding clauses, wherein said detector arrangement comprises at least one electro-optic emitter/detector pair located within said access chamber such that an electromagnetic radiation beam between each said at least one emitter/detector pair extends transversely across said access chamber, and operative to output said signal indicative of presence of a pest when said pest passes through said electromagnetic radiation beam.

16. A bait station according to clause 15, wherein said at least one electro-optic emitter/detector pair is located at a position spaced from a floor of said access chamber.

17. A bait station according to clause 15 or 16, comprising two electro-optic emitter/detector pairs spaced apart longitudinally within said access chamber.

18. A bait station according to clause 17, wherein said controller is operative to record a pest activity event only upon receipt of a signal indicative of presence of a pest from both electro-optic emitter/detector pairs simultaneously.

19. A bait station according to any one of clauses 15 to 18, wherein said electro-optic emitter/detector pairs comprise infrared devices.

20. A bait station according to any one of the preceding clauses, wherein said detector arrangement comprises, or, when dependent upon any one of clauses 15 to 19, further comprises, a pressure sensor operative to output said signal indicative of presence of a pest when a pest exerts pressure thereon.

21. A bait station according to clause 20, wherein said pressure sensor is arranged to output said signal indicative of presence of a pest only when a pressure equivalent to a pest weight of a predetermined amount is exerted on said pressure sensor.

22. A bait station according to any one of the preceding clauses, wherein said detector arrangement further comprises a sensor operative to be activated when a pest touches said sensor.

23. A bait station according to clause 22, wherein said sensor comprises a microswitch.

24. A bait station according to any one of the preceding clauses, further comprising a timer operative to be initiated by said controller when said controller receives a signal indicative of presence of a pest in said trap.

25. A bait station according to clause 24, wherein said controller is operative to monitor an elapsed time recorded by said timer from initiation and, responsive to occurrence of a number of recorded pest activity events at least equal to a predetermined number within an elapsed time less than a predetermined period, operates to implement movement of said closure element from said first position to said second position to open said access port between said access chamber and said bait chamber.

26. A bait station according to clause 24 or 25, wherein an output from said timer is coupled to a visual display operative to display time elapsed from initiation of said timer.

27. A bait station according to any one of the preceding clauses, further comprising an indicator operative to indicate occurrence of pest activity responsive to receipt of a signal transmitted by said controller upon determination by said controller that a number of recorded pest activity events is at least equal to a predetermined number.

28. A bait station according to clause 27, wherein said indicator is operative to generate an audible and/or visible signal for indicating pest activity.

29. A bait station according to any one of the preceding clauses, further comprising a transmitter operative to transmit a data signal indicative of pest activity to a remote location.

30. A bait station according to any one of the preceding clauses, further comprising a receiver operative to receive data from the remote location.

31. A bait station according to clause 30, wherein said receiver is operative, responsive to receipt of said data from the remote location, to communicate said data to said controller which, responsive to receipt of said data, is operative to change operating parameters in said bait station.

32. A bait station according to any one of clauses 27 to 31, wherein said indicator is configured to extend through an aperture formed in said enclosure.

33. A bait station according to any one of clauses 27 to 31, wherein said indicator is configured to extend through said at least one entry port.

34. A bait station according to any one of the preceding clauses, further comprising an integral power source for powering elements of said bait station.

35. A bait station according to any one of the preceding clauses, wherein said partition is an integral part of said enclosure.

36. A bait station according to any one of clauses 1 to 34, wherein said partition is removable from said enclosure.

37. A bait station according to any one of the preceding clauses, wherein said controller and/or said detector arrangement and/or said closure element is located on said partition.

38. A bait station according to clause 7 or any one of clauses 8 to 37 when directly or indirectly dependent upon clause 7, wherein said catch mechanism is located on said partition.

39. A bait station according to any one of clauses 9 to 12 or any one of clauses 13 to 38 when directly or indirectly dependent upon clause 9, wherein said actuating arrangement is located on said partition.

40. A bait station according to clause 24 or any one of clauses 25 to 39 when directly or indirectly dependent upon clause 24, wherein said timer is located on said partition.

41. A bait station according to clause 26 or any one of clauses 27 to 40 when directly or indirectly dependent upon clause 26, wherein said visual display is located on said partition.

42. A bait station according to clause 27 or any one of clauses 28 to 41 when directly or indirectly dependent upon clause 27, wherein said indicator is located on said partition.

43. A bait station according to clause 34 or any one of clauses 35 to 42 when directly or indirectly dependent upon clause 34, wherein said power source is located on said partition.

44. A partition for a bait station comprising an enclosure including at least one entry port for permitting entry of a pest into said enclosure, the partition comprising:
a planar element configured for location within said enclosure and arranged to define, when so located, an access chamber leading to said at least one entry port and a bait chamber for holding therein a bait product harmful to a pest;
an access port formed in said planar element and arranged to provide communication between said access chamber and said bait chamber;
a closure element associated with said access port and controllable for movement between a first position in which said access port is covered, and in which said bait chamber is concealed from said access chamber, and a second position in which said access port is uncovered;
a detector arrangement capable of detecting presence of a pest in said access chamber and operative to output a signal indicative of presence or otherwise of a pest;
a controller operative to receive said signal indicative of presence or otherwise of a pest from said detector arrangement and further operative to record a pest activity event upon receipt of a signal indicative of presence of a pest;
wherein responsive to occurrence of a number of recorded pest activity events at least equal to a predetermined number, said controller is operative to implement movement of said closure element from said first position to said second position to open said access port between said access chamber and said bait chamber.

45. A partition according to clause 44, wherein said closure element is operative for slidable movement relative to said partition and to said access port formed in said partition from said first position to said second position and vice versa.

46. A partition according to clause 44 or 45, further comprising a catch mechanism arranged to engage said closure element to retain said closure element in said first position when a bait station in which said partition is located is in an untriggered state.

47. A partition according to clause 46, wherein said catch mechanism is operative, responsive to receipt of a control signal issued by said controller upon determination by the controller that a number of recorded pest activity events is at least equal to a predetermined number, to disengage said closure element for permitting movement of said closure element to said second position.

48. A partition according to clause 46 or 47, wherein said catch mechanism is coupled to an actuating arrangement operative to disengage said catch mechanism from said closure element responsive to receipt of a control signal issued by said controller upon determination by the controller that a number of recorded pest activity events is at least equal to a predetermined number.

49. A partition according to clause 44 or 45, further comprising an actuating arrangement directly coupled to the closure element and operative to control movement of the closure element between the first and second positions.

50. A partition according to clause 49, further comprising a sensor element operative to detect a position of the closure element and wherein the actuating arrangement is operative to control movement of the closure element responsive to a position signal output by the sensor element.

51. A partition according to any one of clauses 48 to 50, wherein said actuating arrangement comprises an electric motor.

52. A partition according to clause 48, wherein said actuating arrangement comprises a solenoid.

53. A partition according to any one of clauses 44 to 48, or clauses 51 or 52 when dependent upon any one of clauses 44 to 48, further comprising biasing means arranged to urge said closure element to said second position.

54. A partition according to any one of clauses 44 to 53, wherein said detector arrangement comprises at least one electro-optic emitter/detector pair configured such that an electromagnetic radiation beam between each said at least one emitter/detector pair extends transversely across said access chamber, and operative to output said signal indicative of presence of a pest when said pest passes through said electromagnetic radiation beam.

55. A partition according to clause 54, wherein said at least one electro-optic emitter/detector pair is arranged for detection at a position spaced from a floor of said access chamber.

56. A partition according to clause 54 or 55, comprising two electro-optic emitter/detector pairs configured for detection at positions spaced apart longitudinally.

57. A partition according to clause 56, wherein said controller is operative to record a pest activity event only upon receipt of a signal indicative of presence of a pest from both electro-optic emitter/detector pairs simultaneously.

58. A partition according to any one of clauses 54 to 57, wherein said electro-optic emitter/detector pairs comprise infrared devices.

59. A partition according to any one of clauses 44 to 58, wherein said detector arrangement comprises, or, when dependent upon any one of clauses 54 to 58, further comprises, a pressure sensor operative to output said signal indicative of presence of a pest when a pest exerts pressure thereon.

60. A partition according to clause 59, wherein said pressure sensor is arranged to output said signal indicative of presence of a pest only when a pressure equivalent to a pest weight of a predetermined amount is exerted on said pressure sensor.

61. A partition according to any one of clauses 44 to 60, wherein said detector arrangement further comprises a sensor operative to be activated when a pest touches said sensor.

62. A bait station according to clause 61, wherein said sensor comprises a microswitch.

63. A partition according to any one of clauses 44 to 62, further comprising a timer operative to be initiated by said controller when said controller receives a signal indicative of presence of a pest in said trap.

64. A partition according to clause 63, wherein said controller is operative to monitor an elapsed time recorded by said timer from initiation and, responsive to occurrence of a number of recorded pest activity events at least equal to a predetermined number within an elapsed time less than a predetermined period, operates to implement movement of said closure element from said first position to said second position to open said access port between said access chamber and said bait chamber.

65. A partition according to clause 63 or 64, wherein an output from said timer is coupled to a visual display located on said partition, said visual display operative to display time elapsed from initiation of said timer.

66. A partition according to any one of clauses 44 to 65, further comprising an indicator operative to indicate occurrence of pest activity responsive to receipt of a signal transmitted by said controller upon determination by said controller that a number of recorded pest activity events is at least equal to a predetermined number.

67. A partition according to clause 66, wherein said indicator is operative to generate an audible and/or visible signal for indicating pest activity.

68. A partition according to any one of clauses 44 to 67, further comprising a transmitter operative to transmit a data signal indicative of pest activity to a remote location.

69. A partition according to any one of clauses 44 to 68, further comprising a receiver operative to receive data from the remote location.

70. A partition according to clause 69, wherein said receiver is operative, responsive to receipt of said data from the remote location, to communicate said data to said controller which, responsive to receipt of said data, is operative to change operating parameters of said partition.

71. A partition according to any one of clauses 44 to 70, further comprising an integral power source for powering elements of said partition.

72. A receiver device for receiving a data signal indicative of pest activity from a bait station according to clause 29 or any one of clauses 30 to 43 when directly or indirectly dependent upon clause 29, or a partition according to clause 68, or any one of clauses 69 to 71 when directly or indirectly dependent upon clause 68.

73. A method of operation of a bait station, said bait station comprising an enclosure defining an access chamber and a bait chamber, said access chamber including at least one entry port for permitting entry of a pest into said enclosure, and said bait chamber configured to hold therein a bait product harmful to a pest, wherein said bait chamber is accessible from said access chamber via an access port formed in a partition section separating said access chamber and said bait chamber, the method comprising the steps of:
detecting, using a detector arrangement of said bait station, presence of a pest in said access chamber;
outputting, from said detector arrangement, a signal indicative of presence or otherwise of a pest;
receiving, at a controller of said bait station, said signal indicative of presence or otherwise of a pest;
recording a pest activity event upon receipt, by said controller, of a signal indicative of presence of a pest
wherein responsive to occurrence of a number of recorded pest activity events at least equal to a predetermined number, implementing movement of a closure element associated with said access port from a first position in which said access port is covered, and in which said bait chamber is concealed from said access chamber, to a second position to open said access port between said access chamber and said bait chamber.

74. A method according to clause 73, further comprising retaining said closure element in said first position by a catch mechanism when said bait station is in an untriggered state.

75. A method according to clause 74, further comprising disengaging said catch mechanism from said closure element for permitting movement of said closure element to said second position responsive to receipt of a control signal issued by said controller upon determination by the controller that a number of recorded pest activity events is at least equal to a predetermined number.

76. A method according to clause 73, further comprising controlling movement of the closure element between the first and second positions using an actuating arrangement directly coupled to the closure element.

77. A method according to clause 76, further comprising detecting, using a sensor element, a position of the closure element and controlling movement of the closure element, using said actuating arrangement, responsive to a position signal output by the sensor element.

78. A method according to any one of clauses 73 to 75, further comprising urging, by biasing means, said closure element to said second position.

79. A method according to any one of clauses 73 to 78, further comprising providing, as said detector arrangement, at least one electro-optic emitter/detector pair located within said access chamber such that an electromagnetic radiation beam between each said at least one emitter/detector pair extends transversely across said access chamber, and outputting, from said at least one electro-optic emitter/detector pair, said signal indicative of presence of a pest when said pest passes through said electromagnetic radiation beam.

80. A method according to 79, further comprising providing two electro-optic emitter/detector pairs spaced apart longitudinally within said access chamber.

81. A method according to clause 80, further comprising recording a pest activity event only upon receipt of a signal indicative of presence of a pest from both electro-optic emitter/detector pairs simultaneously.

82. A method according to any one of clauses 73 to 81, further comprising providing, as said detector arrangement, a pressure sensor operative to output said signal indicative of presence of a pest when a pest exerts pressure thereon.

83. A method according to clause 82, further comprising outputting, from said pressure sensor, said signal indicative of presence of a pest only when a pressure equivalent to a pest weight of a predetermined amount is exerted on said pressure sensor.

84. A method according to any one of clauses 73 to 83, wherein said detector arrangement further comprises a sensor operative to be activated when a pest touches said sensor.

85. A method according to any one of clauses 73 to 84, further comprising providing a timer, and initiating timing by said timer when said controller receives a signal indicative of presence of a pest in said trap.

86. A method according to clause 85, further comprising monitoring, by said controller, an elapsed time recorded by said timer from initiation and, responsive to occurrence of a number of recorded pest activity events at least equal to a predetermined number within an elapsed time less than a predetermined period, implementing movement of said closure element from said first position to said second position to open said access port between said access chamber and said bait chamber.

87. A method according to clause 85 or 86, further comprising outputting a signal from said timer to a visual display, and displaying, by said visual display, time elapsed from initiation of said timer.

88. A method according to any one of clauses 73 to 87, further comprising indicating, by an indicator, occurrence of pest activity responsive to receipt of a signal transmitted by said controller upon determination by said controller that a number of recorded pest activity events is at least equal to a predetermined number.

89. A method according to clause 88, further comprising generating, in said indicator, an audible and/or visible signal for indicating pest activity.

90. A method according to any one of clauses 73 to 89, further comprising providing a transmitter, and transmitting a data signal indicative of pest activity to a remote location.

91 A method according to any one of clauses 73 to 90, further comprising providing a receiver operative to receive data from said remote location.

92. A method according to clause 91, further comprising communicating data received by said receiver to said controller and changing operating parameters in said bait station.

93. A computer program comprising computer program elements operative in a computer processor to implement a method according to any one of clauses 73 to 92.

94. Processor implementable instructions operative in a computer processor to implement a method according to any one of clauses 73 to 92.

95. A computer readable medium carrying a computer program according to clause 93 or processor implementable instructions according to clause 94.

The invention claimed is:

1. A bait station for pest control, comprising:
   an enclosure defining an access chamber and a bait chamber, said access chamber including at least one entry port for permitting entry of a pest into said enclosure, said bait chamber configured to hold therein a bait product harmful to the pest;
   a partition section separating said access chamber and said bait chamber, wherein said bait chamber is accessible from said access chamber via an access port formed in said partition section;
   a closure element associated with said access port and controllable for movement between a first position in which said access port is covered, and in which said bait chamber is concealed from said access chamber, and a second position in which said access port is uncovered;
   a detector arrangement capable of detecting a presence of the pest in said access chamber and operative to output a signal indicative of the presence or otherwise of the pest;
   a controller operative to receive said signal indicative of the presence or otherwise of the pest from said detector arrangement and further operative to record a pest activity event upon receipt of a signal indicative of the presence of the pest;
   wherein responsive to an occurrence of a number of recorded pest activity events at least equal to a predetermined number, said controller is operative to implement movement of said closure element from said first position to said second position to open said access port between said access chamber and said bait chamber.

2. The bait station according to claim 1, wherein said enclosure comprises a base portion and a lid portion, said lid portion and said base portion arranged to cooperatively engage to enclose a volume which forms said access chamber and said bait chamber.

3. The bait station according to claim 1, wherein said access chamber forms a tunnel section with a first entry port of said at least one entry port at a first ends thereof and a second entry port of said at least one entry port at a second end thereof.

4. The bait station according to claim 1, wherein said closure element is operative for slidable movement between said first position and said second position relative to said partition section and to said access port formed in said partition section.

5. The bait station according to claim 1, further comprising a catch mechanism arranged to engage said closure element to retain said closure element in said first position when said bait station is in an untriggered state.

6. The bait station according to claim 5, wherein said catch mechanism is operative, responsive to receipt of a control signal issued by said controller upon determination by the controller that said number of recorded pest activity events is at least equal to said predetermined number, to disengage said closure element for permitting movement of said closure element to said second position.

7. The bait station according to claim 5, wherein said catch mechanism is coupled to an actuating arrangement operative to disengage said catch mechanism from said closure element responsive to receipt of a control signal issued by said controller upon determination by said controller that said number of recorded pest activity events is at least equal to said predetermined number.

8. The bait station according to claim 1, further comprising biasing means arranged to urge said closure element to said second position.

* * * * *